July 29, 1924.

W. CAMPBELL 1,502,903

STEAM TURBINE ROTOR AND METHOD OF AVOIDING WAVE PHENOMENA THEREIN

Filed Feb. 27, 1923     14 Sheets-Sheet 1

Inventor:
Wilfred Campbell,
by
His Attorney.

July 29, 1924.  
W. CAMPBELL  
1,502,903  
STEAM TURBINE ROTOR AND METHOD OF AVOIDING WAVE PHENOMENA THEREIN  
Filed Feb. 27, 1923   14 Sheets-Sheet 4

Inventor:
Wilfred Campbell,
by
His Attorney.

July 29, 1924.

W. CAMPBELL 1,502,903

STEAM TURBINE ROTOR AND METHOD OF AVOIDING WAVE PHENOMENA THEREIN

Filed Feb. 27, 1923

Inventor:
Wilfred Campbell,
by *Alexander S. Smith*
His Attorney

July 29, 1924.

W. CAMPBELL 1,502,903

STEAM TURBINE ROTOR AND METHOD OF AVOIDING WAVE PHENOMENA THEREIN

Filed Feb. 27, 1923    14 Sheets-Sheet 6

Inventor
Wilfred Campbell,
by *Alexander D. Lunt*
His Attorney.

July 29, 1924.                                              1,502,903
W. CAMPBELL
STEAM TURBINE ROTOR AND METHOD OF AVOIDING WAVE PHENOMENA THEREIN
Filed Feb. 27, 1923       14 Sheets-Sheet 7

Inventor:
Wilfred Campbell,
by *Alexander S. Lunt*
His Attorney

July 29, 1924. 1,502,903
W. CAMPBELL
STEAM TURBINE ROTOR AND METHOD OF AVOIDING WAVE PHENOMENA THEREIN
Filed Feb. 27, 1923 14 Sheets-Sheet 8
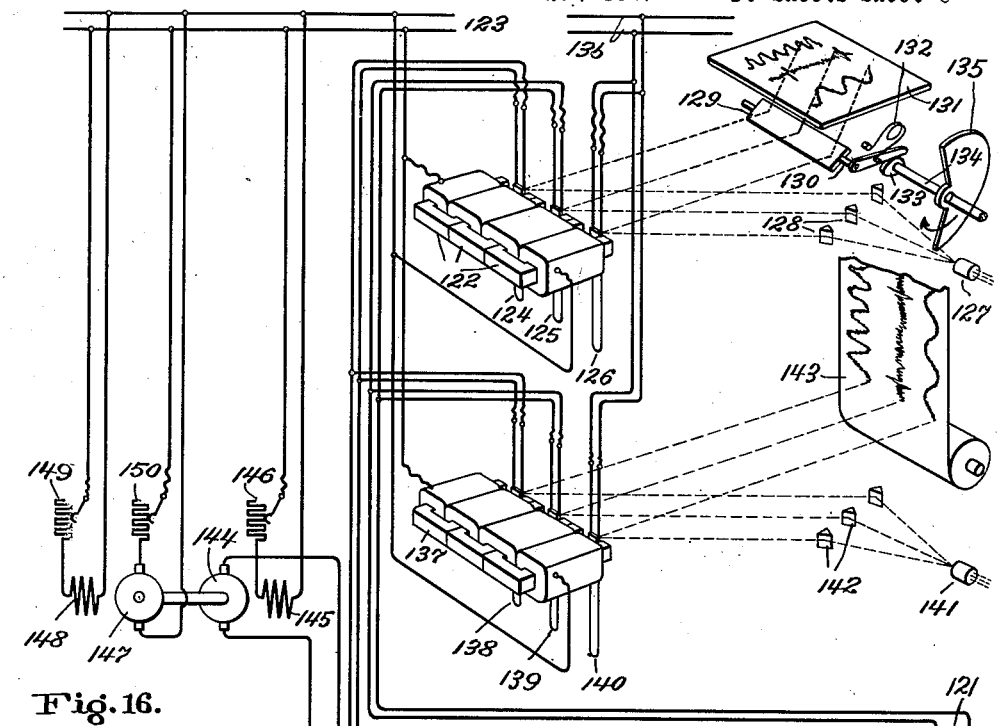
Fig. 16.
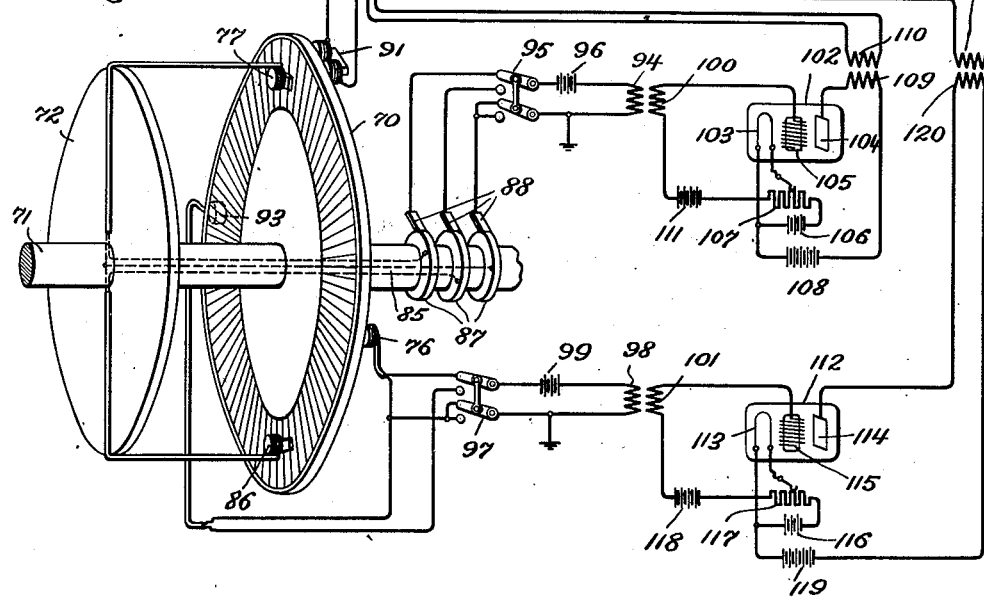
Inventor:
Wilfred Campbell,
by *Alexander F. Smit*
His Attorney

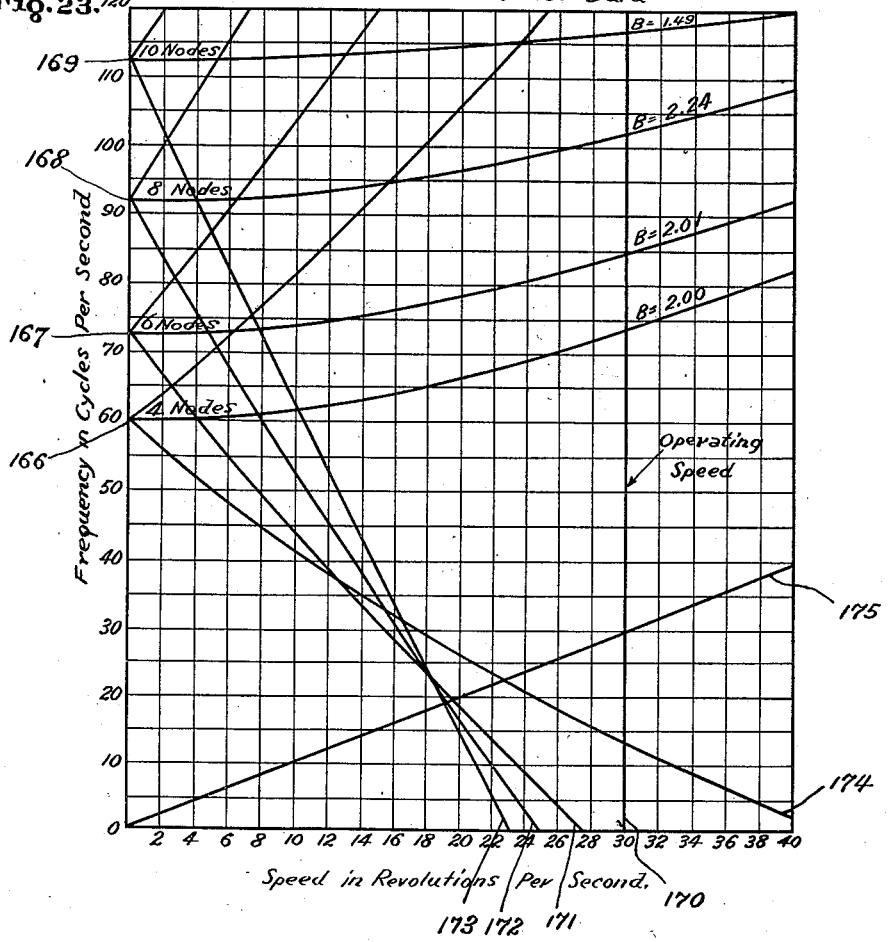
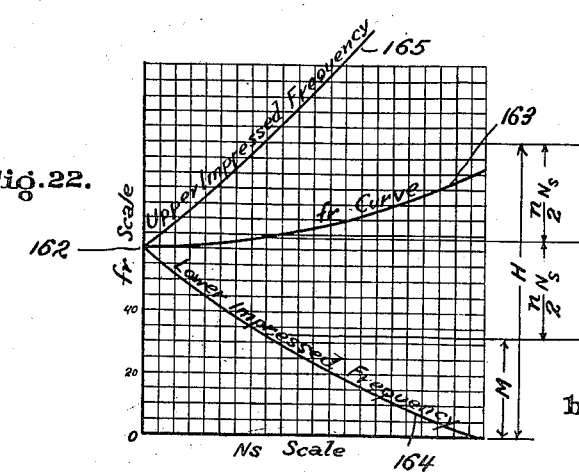
Inventor:
Wilfred Campbell,
His Attorney.

July 29, 1924.
W. CAMPBELL
1,502,903
STEAM TURBINE ROTOR AND METHOD OF AVOIDING WAVE PHENOMENA THEREIN
Filed Feb. 27, 1923    14 Sheets-Sheet 11
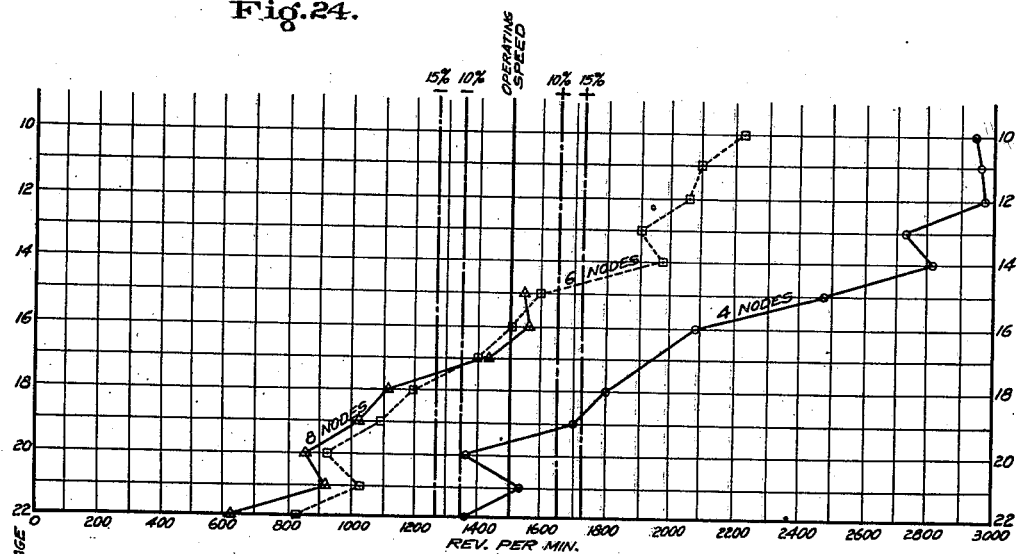
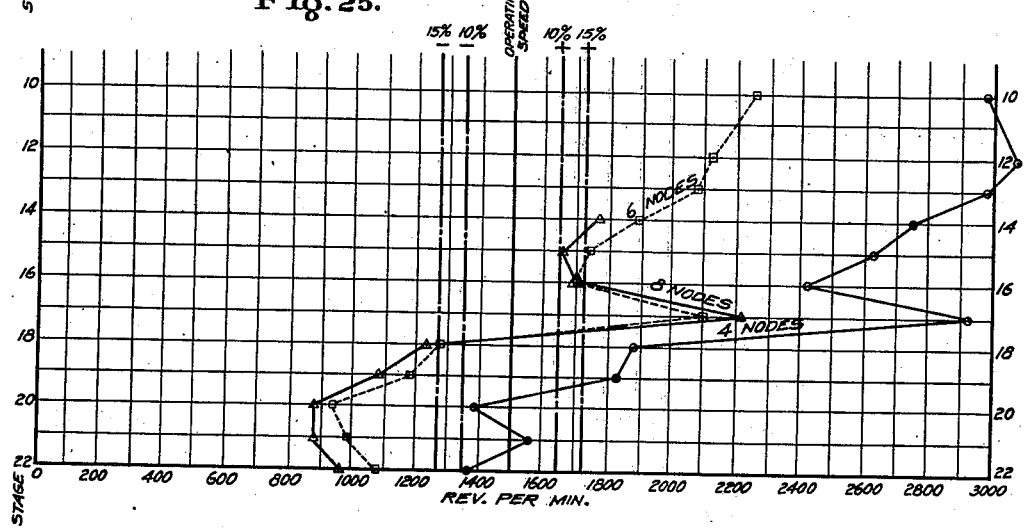
Inventor:
Wilfred Campbell
by
His Attorney July 29, 1924.
W. CAMPBELL
1,502,903
STEAM TURBINE ROTOR AND METHOD OF AVOIDING WAVE PHENOMENA THEREIN
Filed Feb. 27, 1923     14 Sheets-Sheet 12
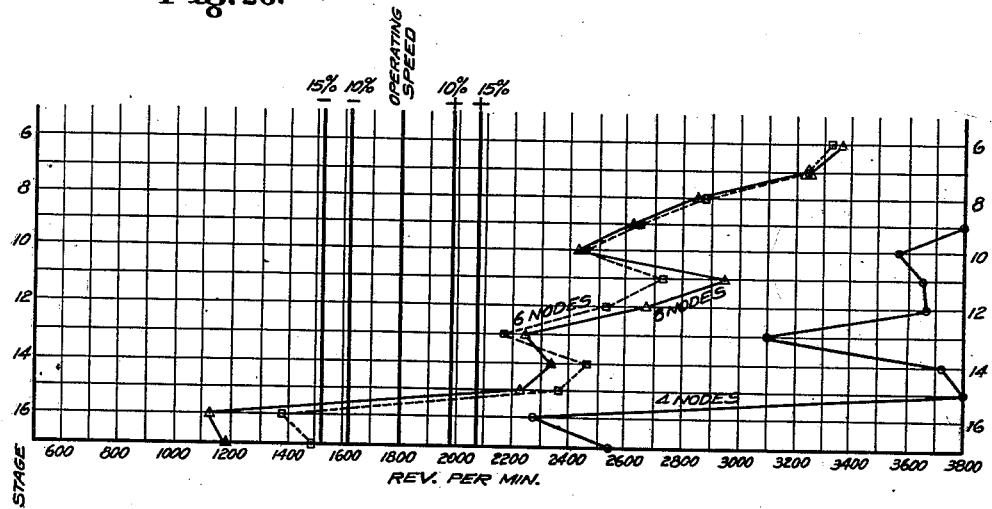
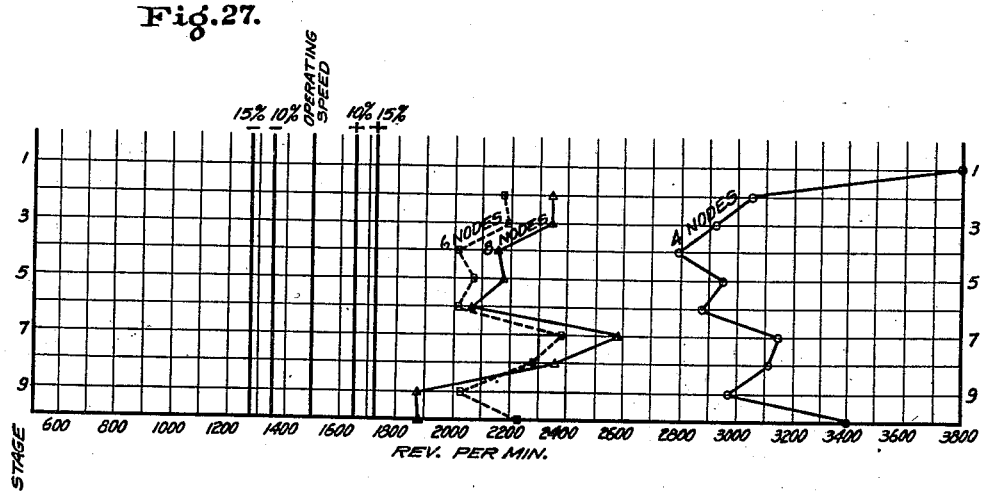
Inventor:
Wilfred Campbell
by Alexander S. ___
His Attorney July 29, 1924.
W. CAMPBELL
1,502,903
STEAM TURBINE ROTOR AND METHOD OF AVOIDING WAVE PHENOMENA THEREIN
Filed Feb. 27, 1923
14 Sheets-Sheet 13

Inventor:
Wilfred Campbell,
by
His Attorney.

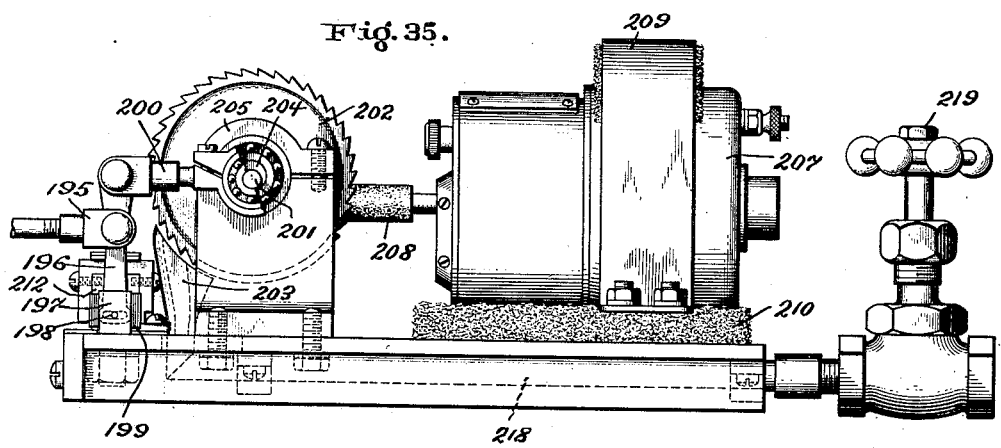
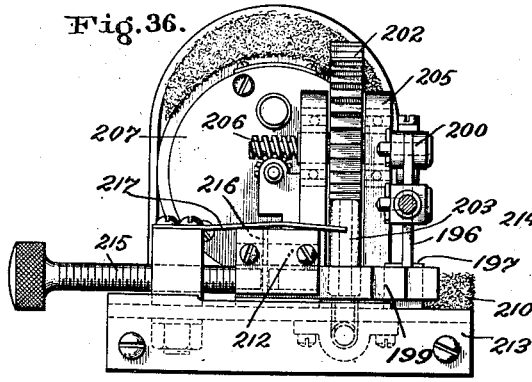
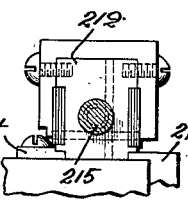
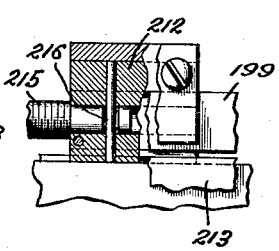
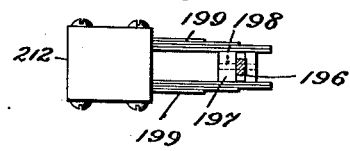
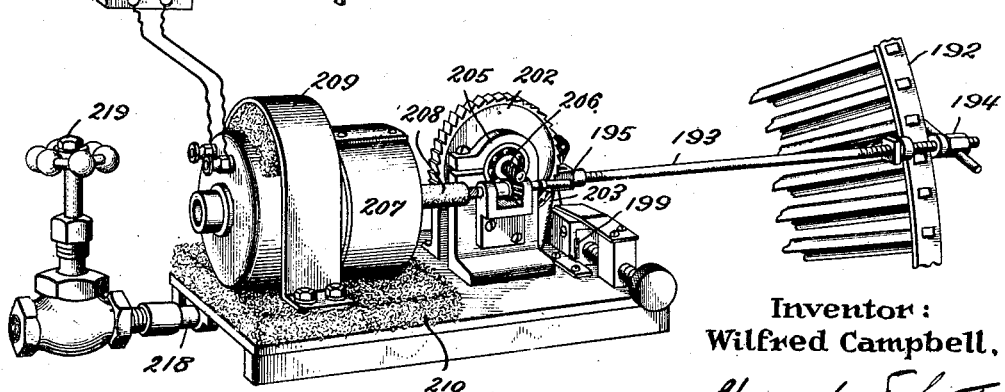

Patented July 29, 1924.

1,502,903

UNITED STATES PATENT OFFICE.

WILFRED CAMPBELL, OF SCHENECTADY, NEW YORK, ASSIGNOR TO GENERAL ELECTRIC COMPANY, A CORPORATION OF NEW YORK.

STEAM-TURBINE ROTOR AND METHOD OF AVOIDING WAVE PHENOMENA THEREIN.

Application filed February 27, 1923. Serial No. 621,655.

*To all whom it may concern:*

Be it known that I, WILFRED CAMPBELL, a subject of the King of Great Britain, residing at Schenectady, county of Schenectady, State of New York, have invented certain new and useful Improvements in Steam-Turbine Rotors and Methods of Avoiding Wave Phenomena Therein, of which the following is a specification.

In the natural course of development of the multistage steam turbine, especially those of the impulse type, and as turbine wheels were made larger and larger, and ran at higher and higher peripheral speeds, breakage of the turbine wheels and breakage of the buckets frequently occurred, which resulted in many cases in actual wrecking of the turbine as a whole. The underlying cause of these troubles has heretofore not been discovered, and accidents in the operation of steam turbines have become more and more frequent, and more and more serious.

I have discovered that the breakages in steam turbine wheels and buckets are due primarily to the development in the wheels of actual wave motions which travel in the wheels. These waves travel in a wheel at speeds depending upon any one of a number of natural periods of vibration of the wheel itself. I have found that when these waves have a direction of travel in the wheel opposite to that of the direction of rotation, dangerous conditions develop if the backward speed of the wave is equal to the forward speed of rotation of the wheel. Under such conditions a backward traveling wave becomes stationary in space, and the amplitude of such a wave may therefore become very large through the application to the wheel of any force stationary in space tending to deflect the wheel in an axial direction. The repeated bending stresses produced in the wheel by traveling waves finally lead to fatigue fractures in the wheel structure.

As will be set forth more in detail hereinafter, I have devised methods whereby the wave phenomena produced in turbine wheels may be predetermined and, by suitable designing and proportioning of the wheel, controlled so as to remove a serious menace heretofore present in the operation of turbines, especially those of large size.

My invention comprises a turbine rotor made up of individual wheels, all of which, by suitable predetermination or "tuning," are rendered free from objectionable wave phenomena at speeds in the immediate vicinity of the normal operating speed of the rotor. The tendency in any wheel of the rotor to produce objectionable wave phenomena at speeds in the neighborhood of the operating speed is ascertained and is definitely controlled so as not to come into operation at any speed differing from the normal operating speed of the rotor by less than certain predetermined limits.

My invention finds special application in elastic fluid turbines of large sizes, wherein, for the purpose of securing increased efficiency and output, it becomes necessary to use wheels of large diameter and a fair degree of lightness in construction. Wheels of this character ordinarily carry a single row of radial buckets at the periphery, and the disk or web of the wheel is relatively thin. The methods which I have devised render it possible to determine the character of wave phenomena apt to occur in such a wheel, and to predict the speeds at which such phenomena will develop; whereby such modification or redesigning or proportioning of the wheel structure as may be necessary, can be performed so as to shift such dangerous critical speeds as may occur, away from dangerous proximity to the normal operating speed of the rotor.

My invention itself will be better understood by reference to the accompanying drawings taken in connection with the following specification.

Fig. 1 is a representation, taken from an actual photograph, of a 17 stage 30,000 kilowatt turbo-alternator built in accordance with my invention, with the turbo-cylinder cover removed to expose to view the turbine wheels of the rotor. In this figure the turbine shaft is indicated at 1; the first or high pressure wheel of the series of wheels on the rotor is indicated at 2; and the last or 17th stage wheel at 3. The alternator driven by the turbine is indicated at 4. The extremity of the lower half of the diaphragm between turbine wheels is indicated, for example, at 5.

Fig. 4 is a view of a turbine wheel in which the breaks have extended only to the buckets themselves; while

Fig. 12 is a view of a wheel testing machine; while

Fig. 16 is a diagram of circuits.

Figs. 17 to 21 inclusive are representations of typical oscillograph records.

Figs. 22 and 23 are diagrams showing relations between wheel speeds and wheel frequencies.

Figs. 24 and 25 are typical diagrams representing the critical speeds for various wheels of turbine rotors in which some of the critical speeds occur in dangerous proximity to the running or operating speed.

Figs. 26 and 27 are diagrams representing the relation of critical speeds to the operating speed of various wheels of two turbine rotors in which no critical speed occurs within dangerous proximity to the operating speed.

Figs. 28 to 34 inclusive are partial sectional views of turbine wheels representing the removal of material from portions of a wheel for purposes of "tuning."

Figs. 35, 36, 37, 38, 39 and 40 are detailed views of a device for vibrating a turbine disk.

While the development of the turbine art dates back many years, only about one decade has passed since troubles began to be experienced with bucket wheels of steam turbine rotors, especially of the impulse type, due to cracking or actual breakage of the wheel disks or of the buckets themselves. In the early stages of the development, these troubles were comparatively infrequent, and they came into prominence only as turbines of larger and larger sizes were built. In many of these large turbines the turbine disks were actually broken and large sections of the wheels themselves were thrown off so as, not only to wreck the turbine, but to damage neighboring apparatus, and, in many cases, cause loss of life.

Figure 1:
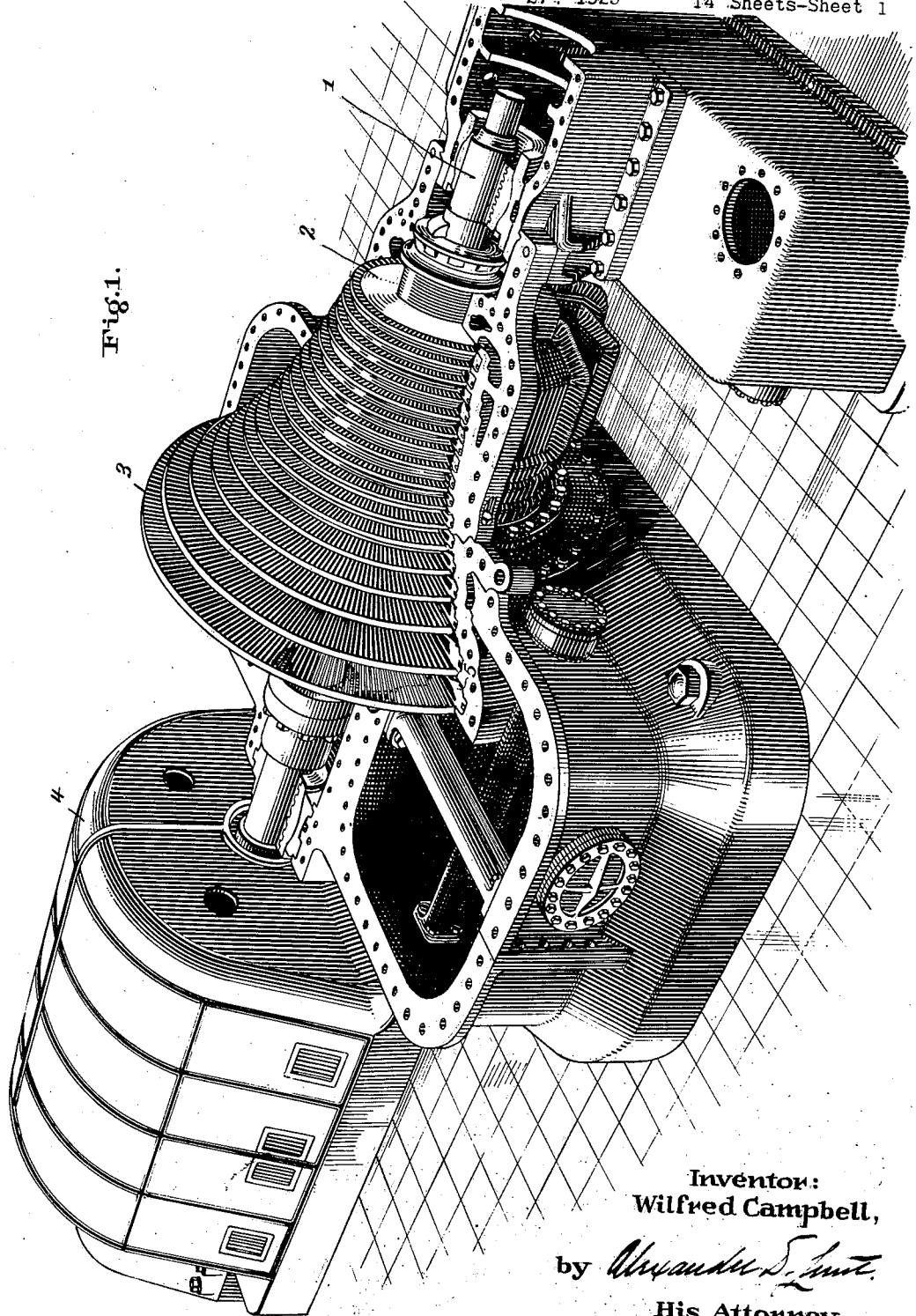
Figure 2:
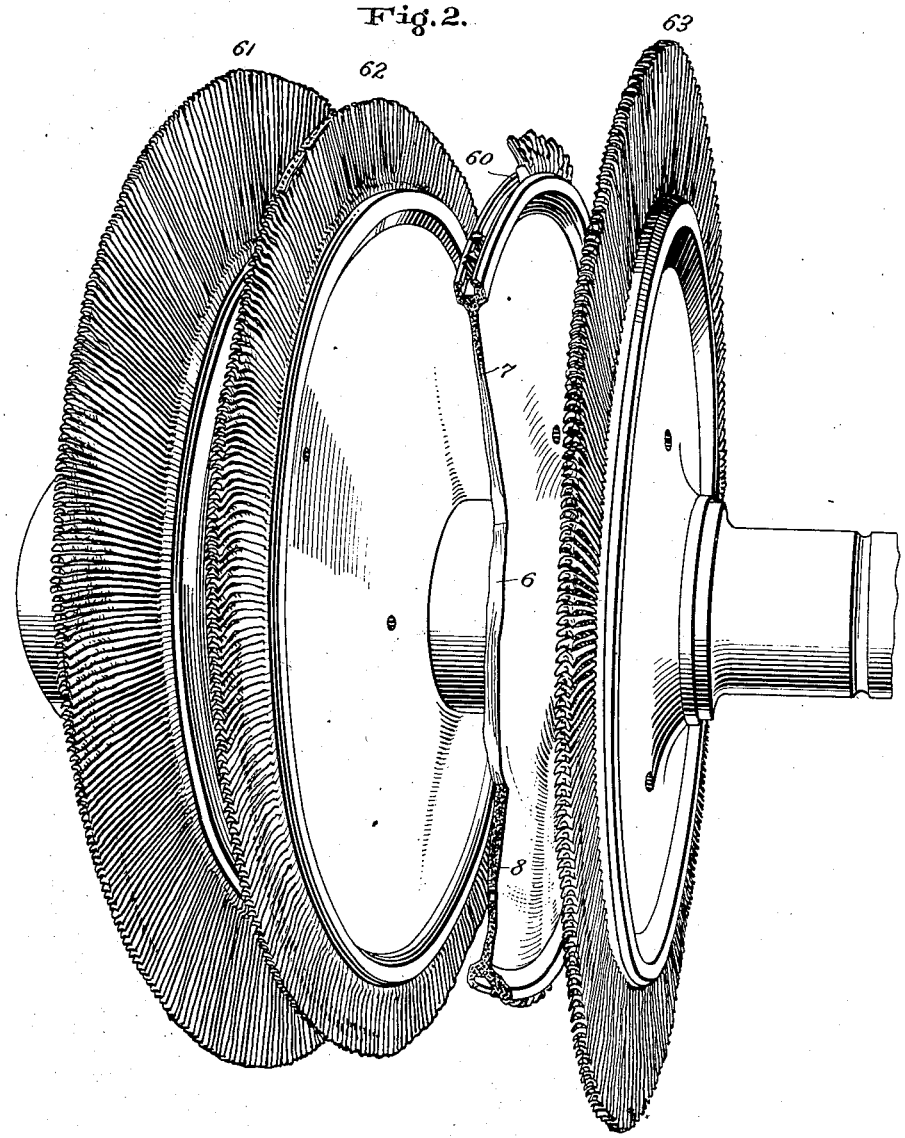
Fig. 2 is a view of a turbine rotor showing the remains of a wheel out of which a large section has been broken.

Fig. 2 of the drawings is a representation of a fracture of a turbine disk extending deep down into the disk itself, showing that a large section of the wheel, along with the buckets mounted thereon, had been driven off. It is to be noted that the part of the fracture indicated at 6 is of a peculiar feathery appearance, which cannot be well shown in the drawing, but which is always associated with breaks due to fatigue strains. The outline of this part follows roughly the arc of a circle of relatively small radius. The outer sections 7 and 8 of the break bear less marked evidences of fatigue strains. The significance of this kind of a break will later be pointed out.

Since the weight of such a broken-out section of the wheel, as indicated in Fig. 2, may amount to from 50 to 250 pounds, and since the peripheral velocity of the wheel may be not greatly different from the muzzle velocity of a cannon ball, it can readily be seen what enormous energy is released by a break of this character.

Figure 3:
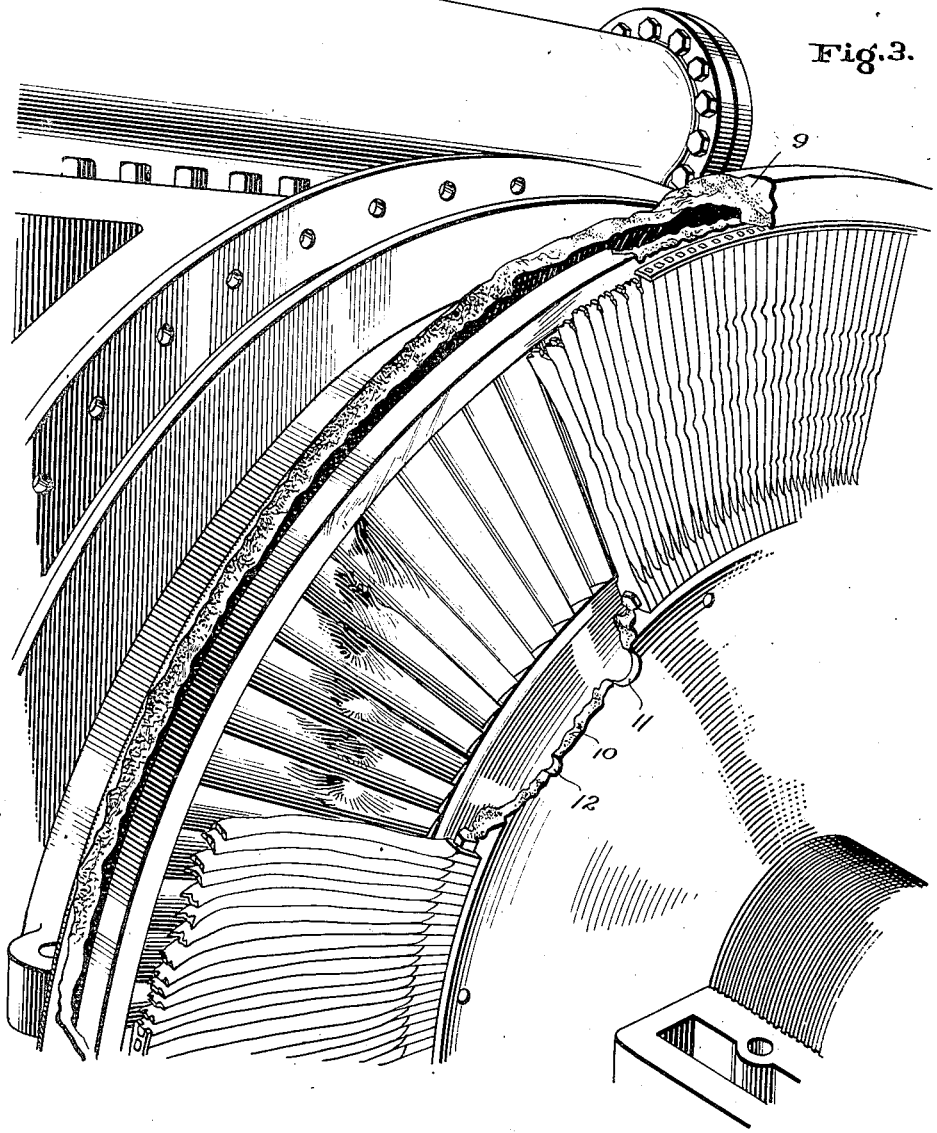
Fig. 3 is a view of the turbine wheel out of which a section, extending only slightly into the web of the wheel, has been broken.

Fig. 3 is a representation of a portion of a large steam turbine after a break of the general character described had occurred. It will be seen that the casing or shell of the turbine has been wrecked, as indicated at 9. In this case the broken-out section of the wheel extends only slightly into the body of the wheel disk as at 10. The character of the break at 10, which cannot be well shown in a drawing, again indicates a fatigue rupture. It is to be noted that the break extends through holes 11 and 12.

Figure 4:
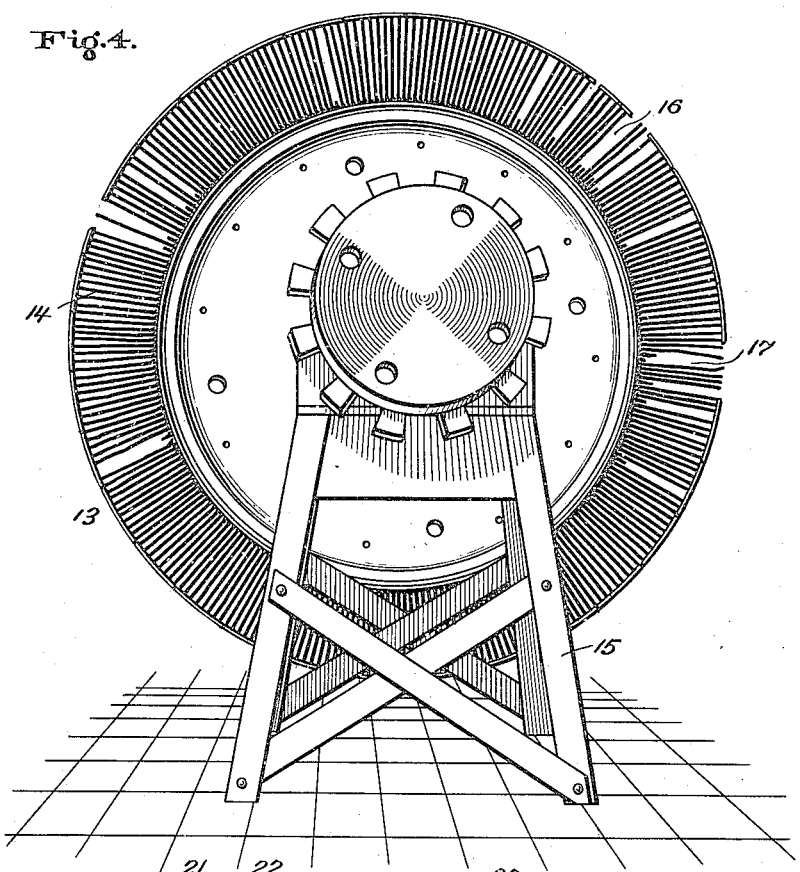
Figure 5:
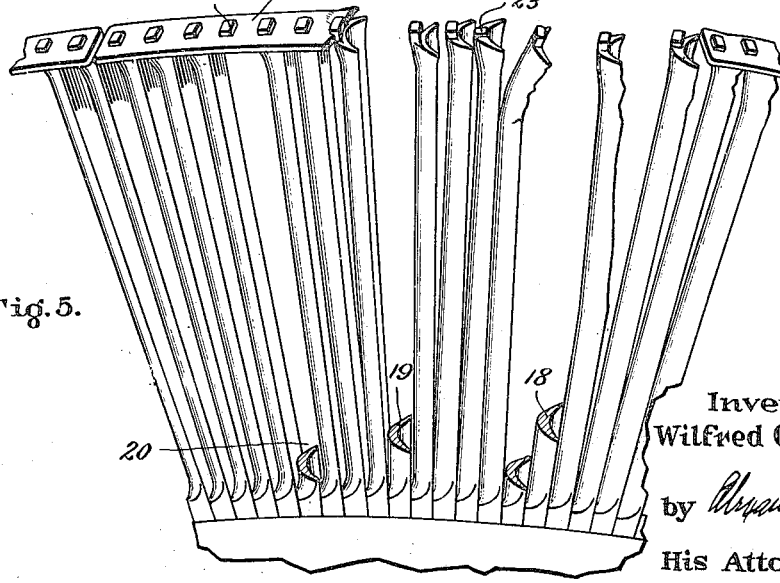
Fig. 5 is a view on an enlarged scale of a broken portion of the wheel shown in Fig. 4.

In Fig. 4 a turbine wheel disk is shown at 13, provided with a single peripheral row of buckets 14. The view of this picture was taken from an actual photograph and represents the turbine rotor mounted upon a shaft and carried by a temporary support 15. It will be observed that numerous buckets have been broken out of the wheel, as indicated by the vacant places such as 16, 17 and the like. Fig. 5 shows an enlarged view of the broken buckets corresponding to the section marked 17 in Fig. 4. The nature of the fractures where the buckets were broken, as for example, at 18 and 19 indicates, as before, breaks due to fatigue action. It will also be noted that at 20 a bucket has been broken out and that the tenon 21 still remains in the bucket cover 22. As will be pointed out hereinafter, the traveling wave produced in this turbine wheel resulted in a shearing off of the tenon, not only in this case, 21, but in the case of the tenon the remains of which are indicated at 23. It is to be observed that the fatigue breaks, in the instances shown in Fig. 4, and in detail in Fig. 5, extend through the buckets only and do not extend into the wheel disk at all. In other words, the radial depth at which the fatigue fractures occurred in the wheel shown in Fig. 4 is still less than that in the wheel shown in Fig. 3. Along with the fracture of the turbine buckets themselves it will of course be noted that the shroud bands or bucket covers have been driven off at various places in the periphery of the wheel as, for example, at points 16 and 17 already indicated.

Figure 6:
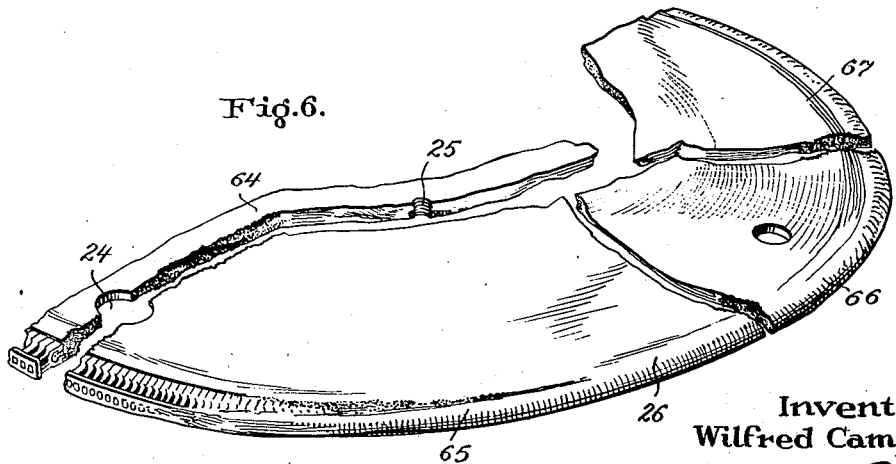
Fig. 6 is a view of the assembled remains of a broken turbine wheel.

Fig. 6 is a view showing parts of a turbine wheel picked up after an accident and pieced together as shown. It will be noted that in this case, as well as in Fig. 3, an outline of the ruptured sections passes through certain balancing or steam equalizing holes indicated at 24 and 25. Furthermore, it will be observed in this figure at 26, that by some kind of rubbing action the buckets had in places actually been melted down by the generation of intense heat.

Figure 7:
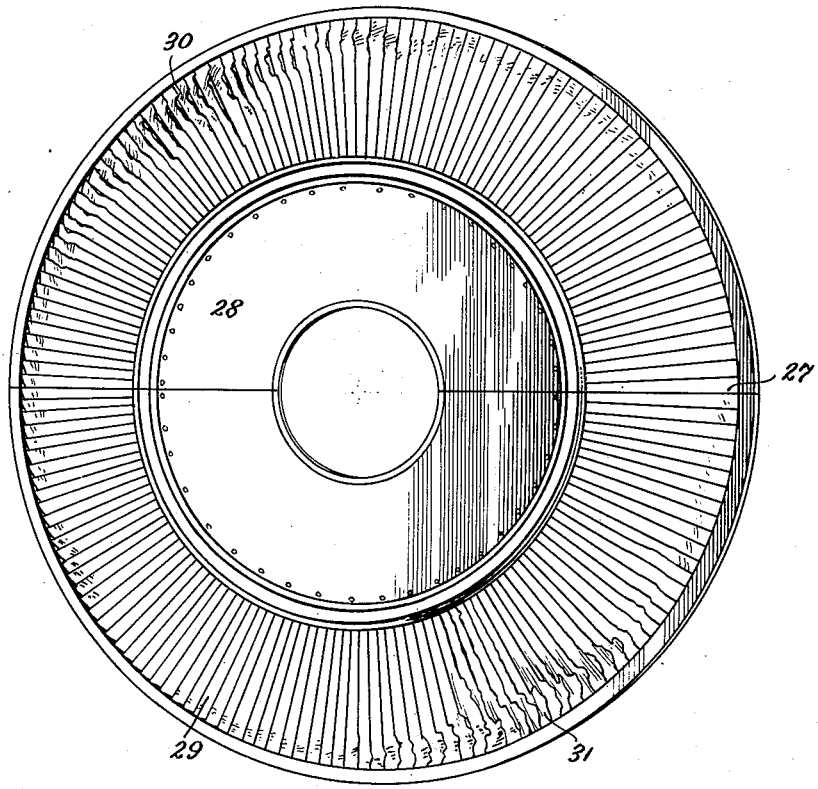
Fig. 7 represents a diaphragm injured by rubbing.

Another manifestation frequently met with is illustrated by Fig. 7. This figure is a representation of a stationary diaphragm which, in the turbine itself, lies between two turbine wheels, as is well understood in the art. The diaphragm is made in two halves along a horizontal dividing plane as at 27, and is assembled around the shaft with suitable packings to prevent escape of steam through the opening for the shaft. The diaphragm has a central solid web 28 and an outer row of nozzles 29. It will be apparent from the drawings that those nozzles in the diametrically opposite regions marked 30 and 31 have apparently been scraped or rubbed by some rough body, while in other portions of the diaphragm no such rubbing has occurred. The significance of this will be hereinafter pointed out.

An enormous amount of investigation has been made by workers in this art in order to solve the difficulties arising from breakages and similar troubles of the general nature already described. Explanations of many kinds have been made to account for these difficulties. It might be supposed that centrifugal forces would account for the more serious breakages. Careful calculation, however, of the stresses involved and of the strength of material of wheels has shown that a margin of safety against centrifugal force exists so ample that such an explanation is by no means adequate.

In the case of large turbine disks it was at one time supposed that inequalities of heating of the disk, the disk being hotter near the periphery than near the center, might cause the disk to buckle into a sort of wavy form around the periphery, whereby certain portions of the disk would be apt to rub against adjacent diaphragms or other parts of the turbine structure. This explanation would not, however, account for the rubbing of a diaphragm in equi-spaced areas as at 30 and 31 in Fig. 7.

Shortly after difficulties due to rubbing and breakage of the steam turbine wheels began to appear, it was suggested by Prof. Stodola, a recognized authority on steam turbines, in an article entitled (when translated), "On the vibration of rotating turbine wheels," published in the Schweizerische Bauzeitung, May 2, 1914, page 251, that the wheel disks themselves were set into vibration and that these vibrations could "become so large that the wheel rim begins to rub against stationary parts, and they immediately become red hot, so that very dangerous conditions are created."

Stodola thereupon made a complicated mathematical investigation of a purely theoretical nature in order to account for the difficulties observed, and he concluded that the vibrations occuring in the turbine disks were nodal in character and might be expected to become dangerous due to resonance with axial vibrations caused by the partial peripheral admission of steam to the turbine disk, or to certain mistakes of construction such, for example, as "when the steam hits the wheel rim periodically at certain places." But this attemped explanation applies, if at all, only to the first stage or wheel, whereas most of the difficulties which have arisen of the character described have occurred in the larger wheels of the rotor, in the lower pressure stages. Stodola proposed no practical remedy. The breakage difficulties in steam turbine rotors not only continued but became increasingly serious as larger and larger turbines were built and put into operation. Moreover, the troubles occurred in turbines having full peripheral admission of steam instead of partial peripheral admission.

A list of some of the accidents, together with other details, which have occured in the operation of large steam turbines is set forth in a paper by Baumann on "Some recent developments in large steam turbine practice" published in the Journal of the Institution of Electrical Engineers (London) vol. 59, 1921, pages 565 to 663. After describing the difficulties, which had been experienced in the operation of steam turbine wheels, especially of large diameter, due in some manner to vibration of the disks themselves, the author states (page 620) that:

"Owing to the lack of satisfactory proposals to overcome the difficulties which have been experienced, due directly or indirectly to the use of high peripheral speeds, the tendency towards the employment of such high peripheral speed has received a definite check, and a more conservative policy at the present time is more likely to produce satisfactory results. . . It is therefore essential that the rigidity of the disks should be such as to preclude their vibration."

In the discussion of this paper Mr. S. E. Fedden proposed (page 630) as a remedy for these difficulties, that the wheels or rotors should be periodically removed from the turbine and rebuilt so as thereby to avoid disastrous results due to fatigue effects following recurrent stresses. He states:

"I presume that after a certain amount of time it will be necessary to take the rotor out and completely reblade it, in order to be on the safe side and prevent a catastrophe."

And he thereafter says,

"There must be something wrong in the design and the manufacture of these turbines to cause such a number of breakages. There is little doubt that turbine makers will put their heads together and learn how to get over these difficulties."

Mr. Kaula stated (page 633):

"In the meantime the main obstacles in the way of the large single-flow design seem to be the difficulty of obtaining a disk of consistently reliable material throughout, coupled with disk vibration, about which little is known. The latter problem is very much akin to that of critical speeds (meaning critical shaft speeds) which was being attacked in 1912 when the author read his previous paper."

Again Mr. Kaula states (page 634):

"If further experience proves that various forms of vibrations which may be transmitted to the disk in one form or another are apt to produce resonance vibrations of a dangerous order in the disk, it will be necessary to determine two factors; first, what nature of vibrations causes such effects, second, what is the period of these vibrations? If these two factors can be predetermined it should be a comparatively simple matter to insure that the natural periods of all disks are well removed from the periods of the vibrations in question."

Dr. Stodola himself contributed a written discussion of the same paper (page 637) but he was silent as to any remedies for the difficulties pointed out.

Baumann (page 638) proposed as a solution that the use of large disks be avoided, and he further recommended (page 642) that such disks as are employed shall not "vibrate under any conditions," and that they shall be run at moderate peripheral speeds.

However, to lessen the diameter of wheel disks and to decrease their normal running speed, all for the purpose of avoiding difficulties due to disk vibrations or wave phenomena, would be a step in the wrong direction in the development of the steam turbine for modern uses. It is well to bear in mind that the application of the steam turbine to the driving of electric generators was one of the most important single steps in the development of the electrical industry. During the last decade the size of turbine generator units has steadily increased until now a 35,000 kilowatt turbine is a familiar unit. Largely by this increase in size, as well as by the great increase in peripheral speeds, the electrical output per unit of steam of these present day large turbine generators is approximately twice the electrical output, for the same quantity of steam, of the best machines built in 1903.

This enormous increase in efficiency and in output is a matter of the utmost practical importance. It is not too much to say that the displacement of the steam engine by the modern large turbo-alternator, with the corresponding reduction in capital cost of the complete generating station, coupled with the corresponding saving in operating costs, has made possible the modern electric power plant. Hence, except possibly in some special case, no proposal for obviating difficulties arising from wave phenomena in turbine disks or wheels can be considered which might have the effect of reducing the output or efficiency of the turbine.

As a result of my investigations I have found that it is not at all necessary, in order to obviate difficulties due to wave phenomena in the turbine wheel or buckets, that the wheel should be so stiffened and its peripheral speed reduced as to avoid all vibration whatever. On the contrary, turbine wheels are now regularly produced in accordance with my invention which, although susceptible to wave phenomena at certain speeds, in the neighborhood of the normal operating speed of the wheel, yet are entirely free from this difficulty at the normal operating speed and at all speeds which do not differ from the normal operating speed by more than predetermined safe margins.

The rotational speeds of turbine wheels at which wave phenomena due to radial nodal conditions may develop markedly I refer to herein as "critical speeds." Such critical speeds occur in turbine wheels whether such wheels are in a condition of practically perfect balance or not and are a function of the mass and of the stiffness or natural resiliency of the wheels modified by centrifugal force, as herein explained. These critical speeds are to be distinguished sharply from critical speeds of shafts which arise from static or dynamic unbalancing of the rotating shaft. Critical shaft speeds are thoroughly understood, but they have nothing in common with critical speeds of the nature herein contemplated.

For each turbine wheel there is a considerable number of nodal critical speeds. Thus, for example, there is a critical speed corresponding to the tendency of the wheel to vibrate in four radial nodes, and further critical speeds identified by vibrational tendencies corresponding to six nodes, eight nodes, ten nodes, twelve nodes and so on; for each of these tendencies there is a corresponding critical speed. It will be evident, therefore, that in view of the multiplicity of critical speeds at which wave phenomena may be set up in a turbine disk, the proposal merely to change the degree of stiffness of the turbine wheel would be as likely to result in encountering new trouble as in avoiding the trouble sought to be remedied. As a matter of fact, in the course of the development leading up to the present invention, repeated attempts of this kind were unsuccessfully made. Thus, for example, a large turbine had developed trouble due to breaking off of buckets. It was believed that by replacing the wheel by another wheel of heavier construction the difficulty might be avoided. This was accordingly done, but the new wheel, within a very short time after the turbine was put in operation, again developed trouble of a character worse than the original trouble.

From my present discoveries I now know that, by this alteration in proportions, the various natural periods of vibration of the new wheel had been so displaced, as compared with those of the old wheel, as to bring the corresponding critical point of the new wheel away from dangerous proximity to the operating speed, but at the same time so as to bring a different critical point, corresponding to a different number of nodes, into dangerous relation to the operating speed.

I have discovered that the wave phenomena in turbine wheels can be freed from danger by an exact predetermination of the critical speeds of the wheels, and by such adjustment or modification of the wheels themselves, in some cases referred to herein as "tuning," as to bring dangerous critical speeds by a safe margin out of the immediate region of the normal operating speed of the turbine.

In accordance with my invention, I do not aim to avoid the occurrence of critical speed tendencies in turbine wheels, but to avoid any such tendencies at speeds dangerously close to the normal operating speed. In turbines of sufficiently small size, and which do not embody my invention, the diameters of the wheels are necessarily small, and the wheels themselves are relatively rigid. Hence, although these wheels may rotate at high speed, nevertheless the normal operating speeds are far below the neighborhood of the frequencies at which the wheels would tend to produce nodal wave phenomena. The critical speeds, therefore, being far above the normal operating speeds, could never give difficulty due to wave phenomena.

By the methods which I have devised steam turbine rotors are produced in which, by predetermination, all of the wheels, without exception, are made free from objectionable wave phenomena within certain margins safely distant or removed from the normal operating speed. The rotors, however, are characterized by the fact that they have critical speeds in one or more of the wheels in the neighborhood of the operating speed, but safely removed therefrom. In some cases there may be some critical speeds above and some below the operating speed, and in other cases, as is preferable, all of the critical speeds lie above the normal operating speed.

Wherever herein I refer to critical speeds of a turbine wheel or rotor as being in the neighborhood of its normal operating speed, I refer to such a degree of proximity that the ordinary variations in design and irregularities of manufacture of such turbine wheels or rotors might be expected, in some cases at least, to result in wheels having certain critical speeds in dangerous proximity to the operating speed. Actual experience leads me to the conclusion that if a turbine wheel has a critical speed differing from the normal operating speed by not materially more than 30 per cent of the normal operating speed, then the degree of proximity of the critical speed to the operating speed is such that precaution as herein explained must be observed in the manufacture of such wheels, and for that reason I may refer to such critical speeds as being within the neighborhood of the operating speed.

Where, however, the critical speed nearest to the normal operating speed of the turbine rotor differs therefrom by materially more than 30 per cent, my experience shows that ordinary variations in design and irregularities of manufacture of that type of wheel are not likely to result in a wheel having a critical speed substantially closer to the normal operating speed than the safe limits hereinafter specified and such critical speed I consider as not being in the neighborhood of the operating speed. Those turbine rotors having all of their wheels, without exception, with critical speeds differing from the normal operating speed by materially more than 30 per cent, are therefore not of a type requiring the practice of my invention.

Figure 9:
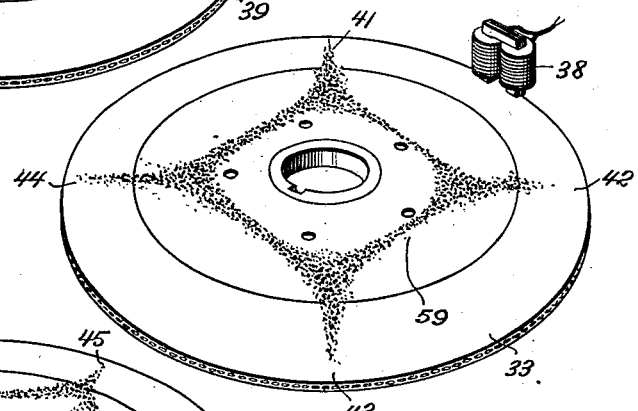
Figure 10:
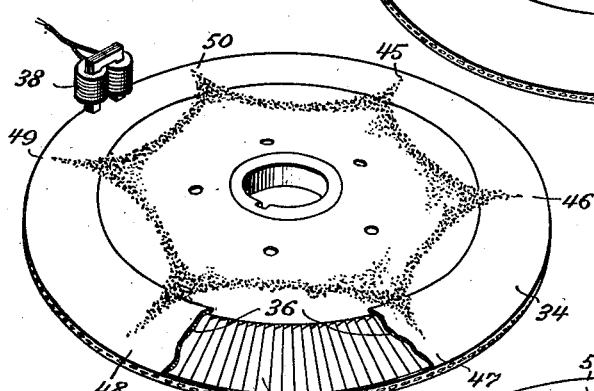
Figure 11:
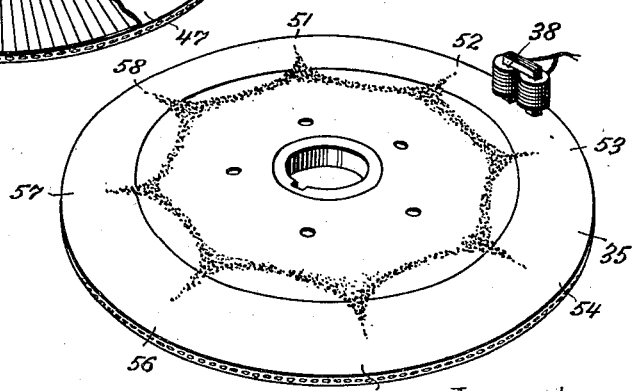

The vibrational tendencies of turbine wheels which lead to the production of wave phenomena may be considered first in the relations which present themselves when the wheel is at rest. Figs. 8 and 9 and 10 and 11 are representations, taken from actual photographs, of a turbine wheel arranged in such a manner as to exhibit the production of radial nodes when set into vibration. The turbine wheel is shown at rest. In each case paper has been spread over the bucket area of the wheel indicated by the ring-shaped areas 32 and 33 and 34 and 35. In Fig. 10, the paper is represented as being cut away at 36 in order to show the bucket area 37 immediately beneath.

In each instance shown in Figs. 8 to 11, an electromagnet 38 is mounted on a suitable support, not shown, in proximity to the turbine wheel. When an alternating current of any desired frequency is sent through this magnet, the current being obtained from a suitable source, such as a variable speed motor generator set, the magnet exerts a periodic pull upon the rim of the steel wheel and sets the same into vibration. In order to render apparent the existence of these vibrations, granulated coal or coarse sand is first sprinkled over the wheel, and over the paper superposed thereon, in as uniform a manner as possible, and the wheel is then caused to vibrate by the action of the electromagnet. The frequency of the current used in exciting the electromagnet is then gradually varied until the coal shows a tendency to collect in the form of certain geometrical figures on the surface of the wheel. When the frequency of the magnetic pull in the magnet happens to coincide with some natural period of vibration of the disk, the coal granules produce a geometrical figure having either two or four or six or eight or some higher number of cusps or points joined together by intervening loops so as to make a sort of a scallop. The outlines of these geometrical figures are formed of collections of coal granules which indicate points where the wheel is at rest, whereas the areas or ventral segments of the wheel, from which coal granules have been shaken free, correspond to those parts in which vibration has occurred. Thus around the wheel shown in various conditions in Figs. 8 to 11, are configurations or coal granule figures showing that, in the respective cases, there were two points 39 and 40 in Fig. 8 at which there was substantially no vibration, while in Fig. 9 there were four corresponding points 41 to 44; in Fig. 10, six corresponding points 45 to 50; and in Fig. 11, eight corresponding points 51 to 58. These points may be designated as radial nodes.

Figure 8:
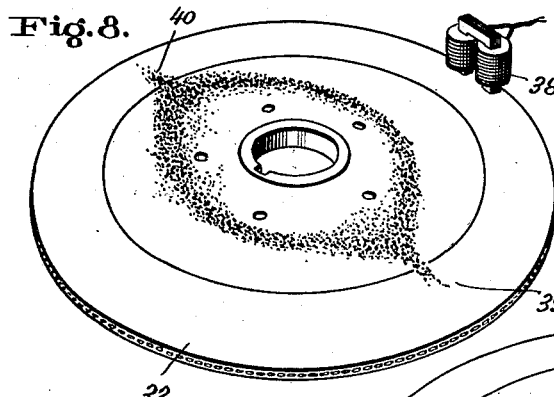
Figs. 8, 9, 10 and 11 represent various types of nodal vibrations in a turbine wheel.

Fig. 8 therefore represents a vibrational tendency corresponding to two nodes; Fig. 9 a vibrational tendency corresponding to four nodes; Fig. 10 a vibrational tendency corresponding to six nodes; and Fig. 11 a vibrational tendency corresponding to eight nodes. All of these figures represent different conditions of the same identical wheel, and show clearly that such a wheel may vibrate in two nodes or four nodes or six nodes or eight nodes according to the frequency of vibration imposed upon the wheel by the alternating current magnet or other vibrating forces. It is only when the externally applied vibrating force comes into resonance with the natural vibrating tendency of the wheel that these nodal tendencies become evident.

It must not be supposed, however, that the tendency for the wheel to vibrate in radial nodes when the wheel is at rest, is exhibited in the same manner in the wheel when it is in rotation. In fact, as I have found, an extraordinary action occurs. At speeds of rotation at which resonance effects tend to be produced in the wheel itself the vibrating nodal sections of the wheel do not remain fixed in the wheel, as exhibited in Figs. 8 to 11, but give rise to nodal traveling waves of considerable magnitude. As each point in the wheel rim is periodically displaced from side to side of the wheel the disturbance is transmitted around the wheel itself as a wave motion. That motion is increased in amplitude by any applied force transmitted from the outside of the wheel in resonance with, or approximately in resonance with series of waves corresponding to some natural period of vibration which would tend to produce nodes. In practice it has been found that for each of the nodal critical speeds there is a wave traveling backward in the wheel at the same speed as the forward travel of the wheel, whereby the wave becomes stationary in space. Being thus stationary in space, any force or impulse imparted to the wheel from points outside the wheel will act continually to increase or sustain the amplitude of the wheel deflection. This is a dangerous condition of resonance.

At the same time that such stationary waves are produced there may be a forward traveling wave, due perhaps to reflection from the backward traveling wave caused by irregularities in the wheel structure, but it is found in practice that such a wave is generally of negligible amplitude.

When a backward traveling wave has been initiated in a turbine wheel some small portion of the reaction steam energy is absorbed in building up and maintaining this type of wave. At the same time, the same reactive steam energy will tend to dampen the forward wave when once initiated. One particular wheel of large diameter required only about 80 watts of energy in causing and maintaining a vibration of dangerous amplitude. In service about 6000 kw. of steam energy entered this stage of the turbine, about 2000 kw. of energy being rejected as residual. The feathering action of the buckets due to a backward wave travel causes a pulsating variation in the axial component of the reactive steam energy which is in direction and time the same as the natural period of the wheel itself; for a forward wave the pulsation would be in time but opposite in direction to the natural vibration period and, therefore, is dampened by the steam action. A model steel wheel demonstrates this particular feature. This difference in the relative magnitude of the waves traveling in opposite directions, though at the same speeds in the wheel, may perhaps be explained by aid of the mathematical conception that a periodic or alternating action may be considered as the equivalent of two waves of equal amplitude traveling in opposite directions. If, however, one of the waves be of greater amplitude than the other a rotational effect will appear.

When therefore in a turbine disk in rotation, externally applied forces act upon the disk so as to come into resonance with any one of the natural periods of vibration presented by the disk, the tendency of the disk to vibrate will be stimulated in such a way as to cause, at the first instant, what might be considered as the equivalent of two sets of waves revolving in opposite directions about the wheel. If the natural period of vibration of the wheel happens to be such that the waves traveling backward in the wheel have such velocity as to become stationary in space, then these standing waves will be reinforced at each revolution of the wheel by the externally applied force which started the deflection of the wheel. The amplitude of the deflection, by this resonant action, becomes greater and greater. As to the wave train traveling in the same direction as the wheel, no such resonant action can develop and the wave train therefore fails to develop unless, as already mentioned, it be brought into action to a minor degree as a reflection of the backward traveling wave.

The initial causes which contribute to the setting up of wave phenomena in a turbine wheel are complex and to some extent obscure. Tests have shown that small externally applied forces are sufficient to produce flexing or wave motion in the wheel of a magnitude apparently out of all proportion to the exciting forces. Phenomena of this nature, being thus resonant in character, may constitute a very serious danger. These resonant effects, as already mentioned, manifest themselves, in their most harmful aspect, as standing waves.

The standing waves in turbine wheels represent a progressive flexing of the turbine wheels from side to side as each point in the wheel periphery follows the motions of the traveling wave in its passage through the point. At any given instant the zero points of the waves might be represented by the nodal figures shown in Figs. 8 to 11.

The flexing of the turbine wheel by these nodal waves, through long continued operation, tends to crystallize or fatigue the metal of the wheel at the points where the greatest effective stress has been applied. This may produce in time such fatigue of the metal as to cause fracture. If the corresponding nodal figure extends deeply into the wheel, then the points of fracture may occur far in from the rim of the wheel, whereas if the nodal figure, as in the case of a large number of nodes, does not extend far toward the axis of the wheel, the fractures will occur nearer to the rim of the wheel.

Accordingly, I have found that where four node wave phenomena occur, fractures usually appear at points far in toward the axis of the wheel, while, if wave phenomena of a higher order of magnitude developed, then the fractures occur nearer the rim of the wheel, or in the buckets alone. A fracture due to four node wave phenomena is well illustrated by Fig. 2 which shows a wheel with a rupture extending at 6 deeply into the body of the wheel. It will be noticed that in addition to the large section broken out of the web of the wheel, the turbine buckets have been stripped off of the wheel rim as at 60. Moreover, it will be observed that the companion wheels 61, 62, and 63 have also been seriously damaged, evidently by a violent rubbing action between the wheel rims or bucketed areas and stationary portions of the turbine structure. The turbine in which this accident occurred was of 30,000 kilowatts capacity. The turbine and generator were wrecked. A more detailed description of this accident is to be found in an article which appeared in the Nov. 22, 1921 issue of the magazine entitled "Power," pages 788 to 793. The issue of the same magazine of Sept. 3, 1918, pp. 345–348, sets forth a similar accident to a 35,000 kilowatt turbine, in which a two hundred pound segment was broken out of the nineteenth stage wheel.

Another instance in which the occurrence of standing waves due to wave phenomena in a turbine disk caused destruction of the wheel is shown in Fig. 6. Here, the parts of the wheel, which had been broken into a considerable number of pieces, were collected, after the accident, and assembled so as to indicate where the lines of fracture occurred. In this figure the broken sections are indicated at 64 to 67. It will be noted that the fractures extended through holes 24 and 25, and deep into the body of the wheel. The break illustrated in this figure occurred in a turbine of 10,000 kilowatts capacity and involved six node wave phenomena.

Fig. 3 shows a sector broken out of a wheel near the rim at 10, by the action of wave phenomena of four nodes. It so happens in this case that the fracture extends through two holes 11 and 12 which had been tapped for the reception of a threaded balancing plug, and in the other case as a pressure equalizing opening to equalize the steam pressure on both sides of the disk. It is now evident that the break occurred at this point because the contour of the nodal figure happened to bring the maximum stressed region into approximate coincidence with the highly stressed hole region.

This will be understood by reference to Fig. 9 which shows the inner portion of the nodal figure far in from the rim, as at 59.

At one time it was thought that such breaks were due to the weakening of the wheel disk by the presence of these holes with their sharp edges which, as is well known, tend to localize applied stress. It may be noted in passing that, as one measure to avoid wheel fracture, a great deal of attention was given to the investigation of the effect of holes in the wheel disk, the effect of sharp corners and the like. Model wheels made of india rubber were built with holes, and were rotated at high speed, and viewed by synchronously periodic flashes of light. By means of a series of crossed lines marked on the wheel the distortion about the holes in the wheel due to rotational stresses could be observed. However, work of this character did not provide a solution of the difficulties.

Figs. 4 and 5, already referred to, show an instance in which, through the action of wave phenomena, buckets were broken out of a wheel, but in which the damage did not extend down into the body of the wheel web. Breaks such as these are due to wave phenomena of a higher order of magnitude, in which the nodal figure is produced at or near the outer portions only of the wheel, as indicated for example by the eight node figures shown in Fig. 11.

Generally speaking, then, the smaller the number of nodes characterizing the wave phenomena the deeper down into the wheel structure does the wave disturbance extend. With wave phenomena of higher nodal character the more likely is the disturbance to be confined to the peripheral areas of the wheels. Hence it is that the most serious accidents which have occurred have been due to four node wave phenomena and the lesser accidents to six and eight node wave phenomena. As will be hereinafter explained, two node wave phenomena do not produce waves stationary in space and, for lack of exciting causes, are rare occurrences.

In order to determine accurately the critical speeds of a turbine wheel, and to make sure that no one of these critical speeds lies in dangerous proximity to the operating speed of the turbine wheel, it is necessary to resort to data obtained through actual tests of such turbine wheels. These tests are of such nature as to record accurately the wave phenomena taking place in a turbine wheel, with all the necessary accompanying data. The apparatus to be used and the methods of obtaining and applying the data obtained will now be set forth.

Figure 12:
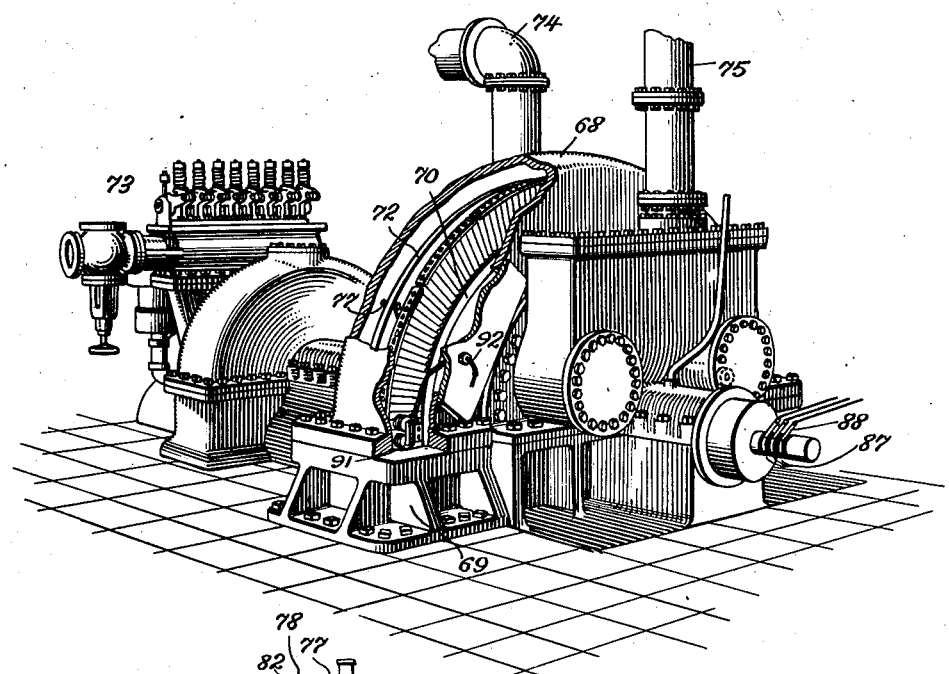
Figure 13:
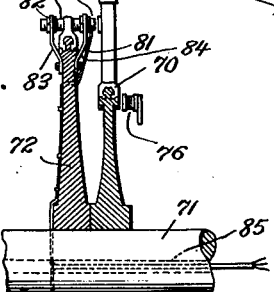
Figs. 13, 14 and 15 are details of parts thereof.

Fig. 12 is a view taken from an actual photograph, with some slight immaterial modifications, of a wheel testing machine built for the purpose of carrying out my invention. This machine comprises a sort of bomb-proof chamber, within which the wheel to be tested is to be operated. The upper half of the casing of this testing chamber, as indicated at 68, is semi-circular in shape and formed so as to constitute a hood or cover to be placed over the wheel to be tested. Due to the possibility of accidents, this member should be made of extreme strength, so that it will not be broken as a result of any accident to the test wheel. In the machine illustrated this hood was of cast steel, eight inches in thickness. The lower section 69 of the machine carries the member 68, and constitutes, with adjacent parts not shown, but which require no special description, a steam-tight chamber. A part of the casing or member 68 is shown broken away, and in the opening a test wheel, in position in this chamber ready for test, is indicated at 70. This wheel, as appears more clearly from a detailed view in Fig. 13, is mounted on the shaft 71 alongside a very heavy and practically vibrationless disk or wheel 72. The shaft 71 carrying the wheels 70 and 72 is connected so that it may be rotated at any desired speed by some suitable source of power, which may be a steam turbine 73.

The pipe 74 supplies steam to the casing 68, while a pipe such as 75 is utilized for conveying the exhaust steam to the vacuum pump and condenser. An absolute pressure of about four pounds per square inch is maintained in the wheel chamber or casing. The purpose of the steam in the wheel chamber while the wheel is under test is, strange as it may seem, to keep the wheel relatively cool. The wheel 70 is rotated by means of power derived from the turbine 73, and is not itself operated in any way so as to generate power, either by the blowing of steam through the bucket area of the wheel or otherwise. If, however, the wheel were to be rotated while surrounded by atmospheric air, so much heat would be generated by the churning of the wheel through the air, that the temperature of the wheel would rise dangerously high. The temperatures may readily become so high as to cause the wheel to become blue by oxidation. By circulating steam through the casing 68, 69, and allowing this steam to be carried off to the vacuum pump and condenser (not shown), the heat energy released by rotation of the wheel is removed, and the temperature of the wheel maintained within safe limits.

In order to observe or record wave motions or vibrations which may occur in the test wheel any means adapted for the purpose may be used. I may make use of standard oscillographs, well known in the electrical art, together with exploring coils suitably located within the structure of the wheel testing machine shown in Fig. 12. Two kinds of exploring coils are employed. One exploring coil is stationary with respect to the wheel to be tested, while the other exploring coil rotates with the wheel. One of the fixed or stationary exploring coils is indicated at 76 in Fig. 13 and, diagrammatically at 76 in Fig. 16. One of the rotating coils is indicated at 77, Fig. 12, more in detail at 77 in Fig. 14 and, diagrammatically at 77 in Fig. 16. These exploring coils transmit to the oscillograph, which records them, electrical pictures of the movements of the turbine wheel. The stationary coil 76 transmits a picture of the movements of each point in the wheel rim toward and away from the exploring coil as the wheel passes by that coil. The movable coil 77, which rotates with the wheel, on the other hand, records only the lateral motion of one given point in the wheel circumference. The records from these two coils disclose the nature of the wave phenomena developed in the wheel.

Figure 14:
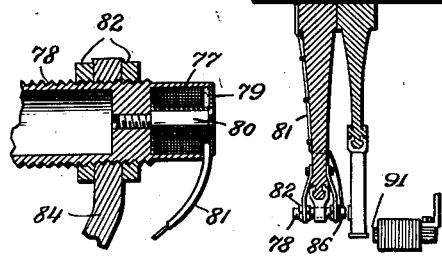

The exploring coils, being located within the casing of the wheel testing machine, should be steam proof. For this purpose the coils may be completely enclosed by a metal casing, so as to prevent the access of steam. In Fig. 14 the coil 77 is shown as being carried within the end of the tube 78 of magnetic material. A cover plate 79, of brass or the like, closes the opening in which the coil 77 is held, and the same is secured in place by the bolt 80 of magnetic material forming the core of the coil 77. The metal cased insulated wire 81 or other suitable steam protected and electrically insulated wire is used for the electrical connections to the coil.

The tubular carrying member 78 is mounted, as shown in Figs. 13 and 14, in a hole in an extension piece on the periphery of the wheel 72, and can be adjusted in the axial direction of the wheel and held in place by lock-nuts 82. The outer ends of the tubular member 78 are carried by brackets 83 and 84. The sheathed wire or conductor 81 is carried down the side of the wheel 72 and out through the shaft as represented at 85.

I find it desirable to have in reserve, in case of trouble with the coil 77 and its circuits, an additional rotating exploring coil diametrically situated at 86. This coil and its supports and connections are substantially the same as in the case of coil 77, and require no special description. The leads from both coils, however, are shown as being brought out through the shaft at 85. One lead from each coil is joined to a common conductor, and the three leads then connect to slip rings 87 and brushes 88 on the outboard end of the shaft as indicated in Fig. 12.

Figure 15:
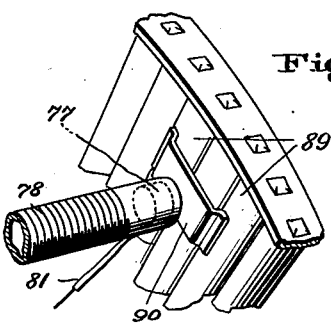

The wheel to be tested, as for example the wheel 70, is located with respect to the coil 77 so that some portion of the wheel is in close proximity to the central core 80 and the magnetic shell 78, constituting parts of the magnetic circuit of the coil 77. In some cases the wheel to be tested may be of such dimensions that the shroud band or bucket covers are opposite the coil 77; but in most cases, the dimensions of the wheel to be tested do not permit of this arrangement. In these cases, I find it convenient, as shown in Fig. 15, to braze or otherwise suitably attach to a bucket section 89 of the wheel, an armature 90 of magnetic material placed so as to come directly opposite the coil 77. Of course, a similar armature is provided in the case of coil 86. In the case of both coils 77 and 86 adjustment is made so as to leave a suitable spacing between the coils and their respective armatures. Ordinarily, the gap is about $\frac{1}{8}$ to $\frac{3}{8}$ inch on the large wheels and less on smaller wheels.

It should be mentioned that the fixed exploring coil 76, already referred to, is suitably supported within the casing 68 adjacent the wheel rim, though not shown in the drawings, and that in this case also there is a diametrically situated reserve coil 93 (Fig. 16) also located within the casing, to which in both instances, suitable electrical connections are made, as will be seen from Fig. 16. The fixed or stationary coils 76 and 93 like the rotating coil 77 are carried each in a shell of magnetic material with a core of magnetic material to constitute an open magnetic circuit as in the case of the rotating coil 77.

For the purpose of causing at will a vibration of the test wheel, I provide a well insulated electromagnet 91 indicated in Fig. 13, and, in perspective view, in Fig. 12. This magnet is located opposite the periphery of the wheel as shown, and suitable connections which lead to a source of current are indicated at 92. It will be observed that the magnet 91 is inside of the casing 68.

The electrical connections of the various exploring coils and the like, the electrical circuits of the amplifiers, of the oscillographs and of the magnet 91 are shown in Fig. 16. In this figure, for purposes of clearness of illustration, the wheel to be tested is indicated conventionally at 70, and the rigid disk 72 is shown, also conventionally, and abnormally displaced laterally so that the circuits may more clearly appear. The leads from the rotating coils 77 and 86 come out through the shaft at 85, and connect with the slip rings 87 and the brushes 88, from which leads extend to the primary 94 of a transformer. A switch 95 permits connection to be made to the leads corresponding either to coil 77 or coil 86 as may be desired. A suitable source of direct current 96 causes current to flow normally through one or the other of the rotating coils 77 or 86. It is of course to be understood that only one of these coils is used in making a test, and that only in case of accident is it necessary to shift to the other coil.

Similarly, the stationary coils 76 and 93 are connected through a switch 97 to the primary 98 of a transformer. The switch 97 permits, as before, the use of either of these coils. A battery or other source of direct current 99 supplies current to either of these coils which may be put in circuit through the switch 97. The secondary windings 100, 101 corresponding to the two primary windings 94 and 98 are connected respectively to suitable amplifying devices for magnifying the current fluctuations produced through the action of the test wheel on the exploring coils, for example, 77 and 76.

It will be understood that the current in these exploring coils, coming from the batteries or other sources 96 and 99, develop a magnetic field, the magnitude of which varies in accordance with the variation in the length of air gap between the adjacent parts of the wheel and the magnetic circuits of the coils. In the case of the rotating coil 77 the lateral vibration of the adjacent part of the wheel produces a change in magnetic reluctance, while in the case of the stationary coils, such as 76, the change in magnetic reluctance is produced by variations in the distance, and so forth, of the wheel rim as it sweeps by the stationary coil. These variations in distance are due partly to irregularities in the structure of the wheel itself and, in case of wave phenomena, to lateral deflections of the wheel.

Suitable amplifier circuits are connected respectively to the secondaries 100 and 101. Such amplifier circuits are well understood in the electrical art and require here no special description. An amplifier of this character is, for example, set forth in the patent to Lowenstein No. 1,231,764, July 3, 1917. In the amplifier circuits connected to the secondary 100 the amplifying tube is indicated at 102. This is an evacuated tube provided with a hot cathode 103, a plate or anode 104 and a grid 105. A battery 106 supplies the current for the cathode 103 and a rheostat 107 serves to adjust the current through the filament or cathode. A circuit connects the plate 104 with the cathode 103 through a source of current 108 and in this circuit there is connected the primary 109 of a transformer, the secondary of which, 110, passes to the oscillographs, as will be described. A battery 111 of a few volts is placed in the grid circuit as shown to give a negative bias to the grid.

The operation of amplifiers of this character is well understood. Fluctuations in voltage produced in the secondary 100 are transmitted to the grid 105, and the changes in potential of the grid cause magnified changes to occur in the current flowing in the circuit of the plate 104. These magnified current changes produce corresponding current fluctuations in the secondary 110 leading to the oscillographs.

The transformer secondary 101, which is operatively related to the stationary exploring coil 76, is similarly provided with amplifier circuits in which the amplifier tube is indicated at 112, the filament or cathode at 113, the anode or plate at 114 and the grid or third electrode at 115. A battery 116, with the adjustable resistance 117, serves to heat the filament to the desired degree. A battery 118 for giving a negative bias to the grid is connected in the grid circuit as before. The plate circuit of this amplifier is provided with the current source 119 and includes the primary 120 of a transformer, the secondary of which, 121, also leads to the oscillographs referred to.

The oscillographs, indicated diagrammatically in the upper portion of Fig. 16, are standard instruments well understood in the electrical arts, for producing and for recording images representing the fluctuations from instant to instant of electric currents. These images may be produced by the tracing of a point of light upon a ground glass or in a mirror, or the images may be recorded permanently on a photographic film. Oscillographs of the character referred to are well known in the electrical art and are set forth for example in the U. S. patent to L. T. Robinson No. 919,467, dated April 27, 1909, and also in a paper on "The oscillograph and its uses" by Lewis T. Robinson, appearing in the Transactions of the American Institute of Electrical Engineers for April 28, 1905, vol. XXIV, pages 185 to 214.

In Fig. 16, representing diagrammatically two of these instruments, the field magnets of one of the oscillographs are indicated at 122. They receive current through current adjusting devices not shown, from any suitable source of direct current, indicated by the supply lines 123. For each of the magnets 122, there is a sort of bifilar suspension 124, 125 and 126, which carries as usual a small mirror. Light from a suitable source, such as an arc lamp, not shown, is transmitted by a lens 127 and prisms 128 to these mirrors, and reflected in turn on suitable receiving surfaces. In the present instance, this consists of an oscillating mirror 129.

This mirror is arranged to oscillate about an axis 130. When this mirror is oscillated the wave forms produced by the mirrors carried by 124, 125 and 126 are rendered visible, either by viewing the pivoted mirror 129 directly or by reflection on a semitransparent receiving screen 131. The pivoted mirror 129 is caused to oscillate by means of an arm which is held by a spring 132 in contact with a cam 133. This cam is driven by a synchronous motor (not shown) connected with cam shaft 134. The synchronous motor receives the current from a small alternator (not shown) driven directly by the wheel carrying shaft 71 so that the cam shaft is driven at the same speed as shaft 71, the result being that the wave motions recorded by the recording coils 77 and 76 appear to be stationary instead of progressing across the field of vision.

The illumination of the screen 131 is interrupted each revolution by shutting off the light source by means of shutter 135. During this dark period the cam causes the mirror to assume its initial position, the light then being allowed to again illuminate the screen.

Actually, only a spot of light is reflected on the screen, but owing to the rapid rotation of the cam shaft and the faculty known as the "persistency of vision," the light spot appears as a complete more or less wavy line. This arrangement is well known in the art and set forth, for example, in "Industrial Electrical Measuring Instruments," pages 378 and 379, published in 1918, by Constable & Company, Ltd., London, England.

The three bifilar circuits 124, 125 and 126 carrying the oscillating mirrors (not shown) of the oscillograph, are connected respectively to those circuits, the wave forms of which it is desired either to observe or record. For reasons which will be explained, the oscillograph referred to is used only for purposes of observation. The oscillograph circuit 124 is connected directly to the secondary 110 of the transformer which receives its impulses from the rotating coil 77. The oscillograph circuit 125 receives its impulses from the transformer secondary 121, which is operatively related to the stationary coil 76. The oscillograph circuit 126 receives its current from a source of alternating current 136 of some definite constant frequency, such as 40 cycles per second, so that the indications produced through the operation of this member of the oscillograph serve as a time standard for the waves produced in the other two circuits of the oscillograph.

The magnets of the second oscillograph referred to are indicated at 137, and are excited by current from the mains 123 which supply current to the magnets of the first oscillograph and the corresponding oscillating members of bifilar suspensions at 138, 139 and 140. The light source for illuminating the oscillating mirrors, not shown, is an arc lamp (not shown) operating in conjunction with lens 141 and prisms 142. The spots of light from the three oscillating mirrors of this oscillograph, unlike the first mentioned oscillograph, are projected on to a photographic film 143 which, in a well understood way, is set into motion at the instant a picture is to be taken. These spots of light therefore trace upon the film a wave form corresponding to that of the respective currents sent through the oscillating members of the oscillograph.

It will be observed that the oscillating members of the two oscillographs are connected in multiple with each other, so that they both receive currents of exactly the same character. Inasmuch as the wave phenomena in the turbine wheel to be tested are transitory in character, the presence or absence of this wave phenomena is observed by inspection of the reflections from the oscillating mirror 129 or the like. Due to its connection to the same electric circuits, the oscillograph with the photographic film 143 receives corresponding vibrations or oscillations. It will be understood, of course, that except when a picture is to be taken, the photographic film 143 is shut off by means of a shutter so that light from the oscillating mirrors cannot reach it. When, however, the operator observes in the mirror 129 of the oscillograph used for observation, the occurrence of any particular wave phenomena which it is desired to record, then at the desired instant, the command may be given to an assistant, who thereupon operates the shutter of the recording oscillograph and thereby causes an exposure to be made upon the film 143, which may thereafter be developed and printed in the usual manner.

Reference has heretofore been made to the stationary electromagnet 91 used to set into vibration the wheel to be tested. The circuits of a motor-generator set for providing electric current of any desired frequencies are indicated in Fig. 16. The armature of an alternating current generator is intended to be represented at 144, the field winding 145 of which is supplied with direct current from the mains 123. A rheostat 146 is used to control the field 145 of the alternating current generator. A motor for driving this generator is represented with its armature 147 on the same shaft as the alternating current generator, and with a field winding 148 supplied from the mains 123. Suitable rheostats 149 and 150 enable the speed of the motor-generator set to be varied through wide limits as may be desired. A tachometer or speed measuring device of any suitable character may be used for measuring the speed of the motor generator set, and this tachometer, in case an electrical tachometer is employed, may be graduated in terms of frequency of the alternating current generated.

In testing a turbine wheel it is convenient first to determine the natural period of vibration of the wheel when at rest, or standing still. This may be done, for example, before the wheel is placed in the wheel testing machine, by the use of a suitably excited electromagnet supported on some firm foundation. The arrangement may be such as indicated in Figs. 8 to 11 inclusive, in which the electromagnet is indicated at 38. It is presupposed that the wheel itself is held in a horizontal plane by being clamped through the hub opening to some firm foundation, and that the electromagnet likewise is clamped by a bracket or other means to the same foundation. A motor-generator set, such as indicated in Fig. 16, may be used to supply the current to the alternating current magnet, and this current may be varied in frequency by varying at will the speed of the motor-generator set. In some cases it may be desirable to determine the natural frequency or frequencies of the wheel after the same has been assembled on its shaft, since the slightly added rigidity due to the presence of the shaft increases the frequency to a slight degree. The pulsating pull produced by the excitation of the magnet by alternating current sets the turbine disk into corresponding vibration. It is to be noted that inasmuch as the magnet exerts a pull for each half wave of the alternating current, the pulsating attraction exerted upon the wheel is numerically double that of the frequency of the alternating current.

In order to determine the number of nodes produced, the area of the wheel within the rim next to the buckets may be filled with water, whereupon the vibration has the effect of breaking up the surface of the water into little ripples corresponding to the parts of the wheel in vibration, but leaving the surface of the water smooth and untroubled at points where no vibration occurs. This renders the nodal figures or spaces readily apparent, so that the number of nodes can be easily determined. After the wheel has been placed in the wheel testing machine, the standing frequency corresponding to any particular number of nodes may be easily checked by oscillograph observation or records.

Figure 17:
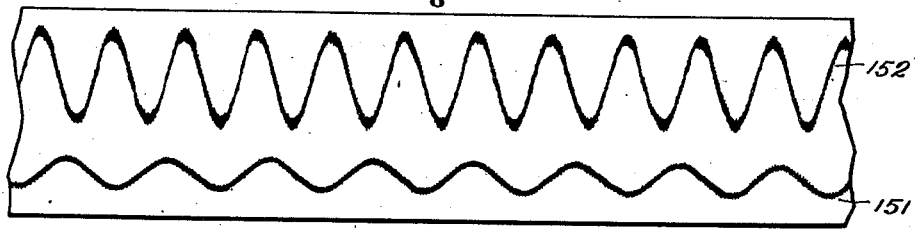

Figs. 17 to 21 are reproductions of photographic oscillograph records of a wheel tested in the wheel testing machine. In Fig. 17 the sine curve 151 is the timing wave corresponding to the alternating current from the supply mains 136 (Fig. 16). The curve 152 is the record of the stationary exploring coil such as 76. The vibration of the wheel disclosed by this curve 152 is caused by the action of the alternating current magnet 91 (Figs. 12 and 16). When the frequency of the current in this magnet has been brought up to a value corresponding to one of the nodal frequencies of the wheel, a relatively large vibration of the wheel ensues as is recorded on the film at 152. Ordinarily it is sufficient to observe the occurrence of vibrations of maximum amplitude by means of the indicating oscillograph and to determine their frequency from the speed of the motor generator.

If now the test wheel be set into rotation, the current in the alternating current magnet 91 having been discontinued, the exploring coil 76 produces indications in the oscillographs, even though no critical speed be obtained at which wave phenomena can develop. Indications of this character are shown in the film record reproduced in Fig. 18. Here, as before, 151 is the timing wave. The irregular line 153 is the record of the stationary coil 76. This is a record of the wheel when running rigidly and entirely free from wave phenomena. It will be noted that various peculiarities in the line repeat themselves at regular intervals. Thus, for example, the points 154 occur repeatedly at regularly spaced intervals. The distance between like points 154 represents the time of one revolution of the wheel. By comparison with the timing wave 151, which in this case was that of an alternating current of 40 cycles, the speed of rotation of the wheel can be accurately determined from the film pictures, and may be checked up with the speed of the turbine or other machine driving the test wheel. The line 153, with its irregularities regularly repeating themselves, may well be referred to as the autograph of the wheel, because it is different for every wheel tested.

Figure 18:
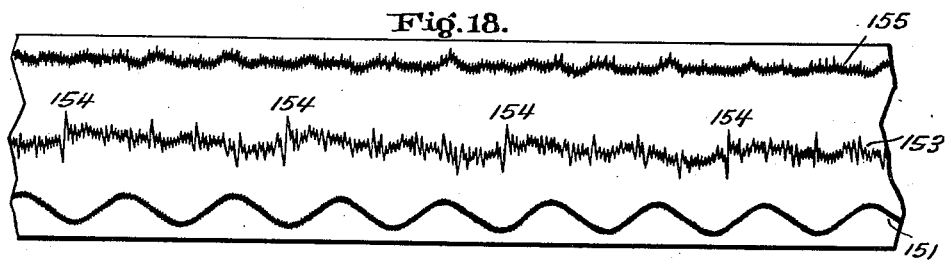
Figure 19:
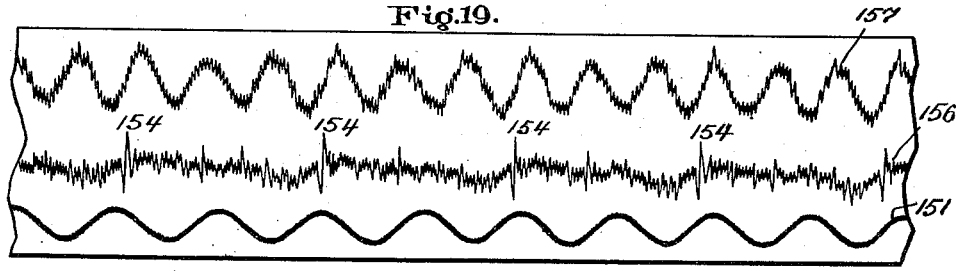

The record on the oscillograph film in Fig. 18 at 155 is that of the rotating coil 77. It will be noted that this record shows numerous fluctuations of very small amplitude. These are so small as to be negligible and show that there were no wave phenomena then present in the wheel.

Upon increasing the speed of rotation of the wheel a point was finally reached where wave phenomena markedly developed. This is clearly shown in the film record in Fig. 19. Here, as before, the timing wave is shown at 151, and the stationary coil record at 156. The revolving coil record is shown at 157. It will be observed that the record of the revolving coil is now in the form of very marked waves while the record of the stationary coil is substantially unchanged. This indicates the presence of traveling waves of considerable magnitude in the turbine wheel. As these traveling waves pass the rotating coil 77 the adjacent portion of the wheel oscillates backward and forward so as to produce the wave record 157. It will be noted that in the space of one revolution, as indicated by the distance between the points 154 in Fig. 19, there occur three wave crests on each side of the zero line in the record 157 of the rotating coil. Since there are three wave crests on each side of the wheel, making a total of six, this record indicates the presence of six node wave phenomena. Furthermore, the fact that the stationary coil gave the same record 154 in Fig. 19 as it did in Fig. 18 indicates that the waves in the wheel had no effect on the stationary coil. It follows, therefore, that the waves were stationary in space, and that the test wheel was running at a critical speed corresponding to six node wave phenomena.

Figure 20:
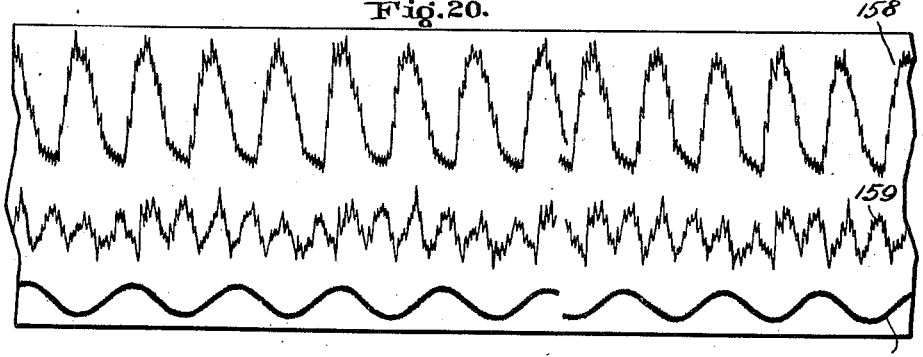

The wheel was then permitted to run at this speed for a short time, whereupon the oscillograph disclosed certain changes taking place in the wave phenomena, as shown in Fig. 20. It will be noted here that the wave phenomena, as shown by the rotating coil record 158, has become much more marked, and furthermore, that the stationary coil record 159 has lost its original character and shows a series of waves which, upon examination, will be found to be just twice as many in number as those appearing in the rotating coil record 158. This double frequency wave 159 represents a wave traveling forward in the wheel. The fact that the frequency shown in curve 159 is exactly twice the frequency of the curve 158, confirms the fact that we are here dealing with critical speed phenomena in which the backwardly traveling wave is stationary in space and which has a forward wave of smaller amplitude superimposed upon it. Such a critical speed we may refer to as a major critical, because of its most frequent occurrence and because the magnitude of the wave phenomena is far greater than in the case of critical speeds due to waves which travel in the wheel at speeds which do not cause them to become stationary in space.

Figure 21:
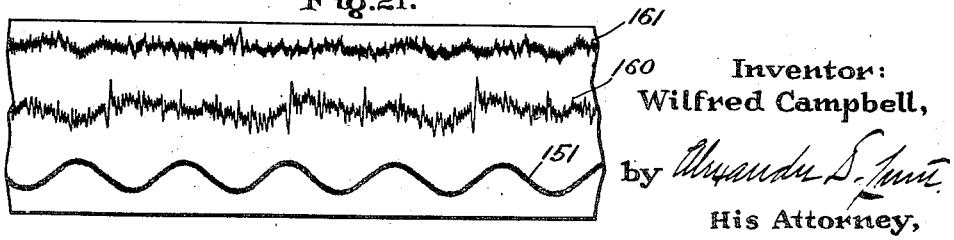

The record in Fig. 21 illustrates what happens upon slightly raising the speed of the turbine wheel over that corresponding to the record reproduced in Fig. 20. It will be noted that the fixed coil record 160, and the rotating coil record 161, have returned practically to the condition exhibited in Fig. 18, wherein the speed of the wheel was slightly below the critical speed instead of slightly above the critical speed, as in Fig. 21.

Investigations carried out on test wheels in the wheel testing machine have demonstrated the extraordinary fact that wave phenomena, taking place in radial nodes, cannot be assumed to follow the natural period of vibration which the wheel has when at rest or standing still. As a matter of fact, the natural periods of vibration of the wheel increase as the wheel is set into rotation. This is readily shown by setting the wheel into nodal vibration corresponding to one of the various numbers of nodes, by the use of the alternating current magnet 91 (Fig. 12) with the wheel at rest, and then, while the wheel is in violent nodal vibration, setting the same into rotation. When the wheel has increased sufficiently in speed, the vibration will die out. Thereupon, by increasing the frequency of the excitation of the magnet by a sufficient amount, the wheel may again be set into lateral motion in the form of traveling nodal waves of the same number of nodes. Furthermore, as I have found, this same nodal wave motion may be produced, not only by increasing the frequency of excitation of the magnet by a given amount, but also by decreasing the frequency. In other words, two values of frequency in the exciting magnet serve to produce the same resonant condition in the wheel. This phenomenon demonstrates that, what has heretofore been referred to, in attempts to explain breakage troubles in turbine wheels, as "fluttering" or vibrations of the wheels, was not in fact such, but was characterized by waves in the wheel itself, traveling either in one direction or the other with respect to the direction of the wheel, or in both directions. When, therefore, for a given speed of rotation of the wheel, a certain frequency of impulse was applied to the wheel, less than that which would set the wheel into vibration if the wheel were at rest, a backwardly traveling wave in the wheel would be induced, while if a higher frequency were applied, a wave traveling forward in the wheel at the same speed in the wheel as the backwardly traveling wheel, would be induced.

These relationships are set forth by the diagram Fig. 22. The horizontal coordinates represent speeds of rotation of the turbine wheel, and the vertical coordinates represent the frequencies of the impulses due to the alternating current magnet 91 and also of the wheel itself. In the particular instance illustrated, the turbine wheel has a frequency, at rest, corresponding to four node vibration, of 60 cycles per second, as indicated at the point 162. When the wheel is set into rotation the frequency of the four node wave phenomena no longer remained stationary but was found to rise along the line indicated at 163. This increase in frequency can be determined directly from the records of the rotating exploring coil. In Fig. 20, the upper curve 158 represents the wave crests passing the rotating coil, so that by comparing the number of wave crests with the timing wave 151, the frequency may be directly determined and plotted.

As a check upon this determination of the running frequency, the wheel may be set into vibration by means, for example, of the alternating current magnet 91, at such higher and lower frequencies as, for each of a series of alternating speeds, correspond to points on the curves 164 and 165. The curves shown in Fig. 22 correspond to curves plotted from data actually taken in a wheel testing machine. It will be observed that points in the curve 165 are spaced above the running frequency curve 163 by amounts exactly equal to the spacing of corresponding points in the curve 164 below the running frequency curve 163.

The lower frequency applied to the alternating current magnet 91, which is necessary to cause the development of this nodal wave phenomena in a turbine wheel, becomes less and less as the speed of the wheel increases. This will appear upon inspection of curve 164, Fig. 22. A point will finally be reached at which the curve crosses the zero line of frequency. This, then, means that the force to be applied to the wheel to cause the development of wave phenomena is a force of zero frequency, that is to say, a undirectional force. We might expect therefore that if a wheel be running at a critical speed, but does not exhibit wave phenomena, then we should find that by pushing the wheel laterally, wave phenomena would be developed. This in fact has been done, in some instances, by deflecting the periphery of a rotating plane surfaced wheel by means of a stick of wood, a steady pull of a direct current magnet, a jet of steam, or the like. This causes the development of stationary wave phenomena.

When a wheel at rest is vibrated, trains of nodal waves moving with equal velocities but in opposite directions in the wheel may be considered to exist. When the wheel is set into rotation, the velocity, in space, of one wave train is increased and the other is decreased by an equal amount. But the very act of setting the wheel into rotation puts into operation the effect of centrifugal force. This causes the natural frequency of the wheel to rise, because the natural resiliency of the wheel, which resists deflection of the wheel, is supplemented by centrifugal force which acts in a similar way, but increases with the speed. What may be termed the running frequency of the nodal phenomena is therefore always higher than the standing frequency or frequency of the wheel when standing still.

For a given speed of the wheel the frequency with which the wave crests due to the backwardly moving wave train pass a given point in space is decreased by an amount equal to $\frac{n}{2}N_s$ (where $n$ represents the number or nodes and $N_s$ the running speed), and the frequency due to the forward moving wave train is increased by a like moment. But this change in frequency is not to be reckoned from the frequency corresponding to the standing frequency but from the running frequency, which is different for each speed of revolution. If now deflecting forces be applied to the wheel with the same frequency with which the wave crests in either the backwardly or forwardly moving wave trains pass a point fixed in space, it is evident that a condition of resonance will be produced. This frequency is equal to the running frequency plus or minus $\frac{n}{2}N_s$.

These relations, demonstrated by actual test, are set forth in the plot in Fig. 22, in which the vertical distances between the curve 163, representing the running frequency, and the curves 164 and 165, representing respectively the lower applied frequency and the higher applied frequency, correspond for each speed of revolution, to the velocity in space of the wave crests in the wheel. These differences are always exactly equal, and are indicated in Fig. 22, as being equal to $\frac{n}{2}N_s$, (where, as before, $n$ equals the number of radial nodes and $N_s$ equals the speed of rotation) and correspond to the frequencies of the waves in the wheel. The ordinates M and H of the curves 164 and 165, on the other hand represent the frequencies of the waves in space. It will be evident that with increase in speed of the wheel the forward traveling wave travels faster in space and the backwardly traveling wave slower. Hence for the backwardly traveling wave a point will finally be reached at which the wave becomes stationary in space. This is shown by the downward slope of the curve 164, which, if continued, would cross the horizontal axis at the speed corresponding to that point. This is a major critical speed already mentioned.

The running frequency 163 then becomes equal to $\frac{n}{2}N_s$. This may be written as $f_r = \frac{n}{2}N_s$ where $f_r$ equals the nodal or running frequency at a wheel speed $N_s$. If we determine experimentally, as in the manner described, the running frequency for any given number of nodes then, as I have found, the relation between the running frequency $f_r$ and the standing frequency $f_s$ may be expressed by the following equation:

$$f_r = \sqrt{f^2_s + BN^2_s}$$

where B is a coefficient depending upon the physical characteristics of the wheel, and differs for different wheels. Fig. 23 gives by way of illustration a number of values of the coefficient B varying from 1.49 to 2.24.

From the two equations given, it readily follows that the critical speed for the corresponding number of nodes is expressed by the relation:

$$N_s = \frac{f_s}{\sqrt{\frac{n^2}{4} - B}}$$

Where, as before $N_s$ represents the speed of the machines in revolutions per second, $n$ the number of radial nodes, B a coefficient usually having a value approximating 2 numerically, and $f_s$ the standing frequency or frequency of the wheel when vibrated.

Where, therefore, one of a number of wheels of like dimensions has been tested in the wheel testing machine so as to determine the magnitude of the coefficient B, the critical speeds of the other wheels may be determined within very small limits of error, by calculation from the nodal standing frequencies of the wheel obtained merely by vibrating the wheel when at rest, either by an electromagnet, as already described, or by other means.

The diagram in Fig. 22 shows only the data pertaining to wave phenomena of a given nodal condition. It is necessary, however, in the construction of turbine wheels which are intended to operate safely at a given operating speed, to determine corresponding data for nodal phenomena of different numbers of nodes likely to produce dangerous operating conditions. Fig. 23 comprises a collection of diagrams, such as Fig. 22, corresponding to nodal wave phenomena of different numbers of nodes. Thus, the three lines radiating from the point 166 represent four node wave phenomena; the lines radiating from the point 167 represent six node wave phenomena; the lines radiating from the point 168 correspond to eight node wave phenomena; while the lines radiating from the point 169 correspond to ten node wave phenomena. On the diagram Fig. 23 are indicated the values of the constant B for the different nodal conditions corresponding to the particular wheel of which the characteristics are indicated in this figure. The heavy line 170 is intended to indicate the operating speed for the turbine wheel. For each of the wave phenomena diagrams the value for the coefficient B in the particular wheel tested, for each number of nodes, is indicated in Fig. 23.

It will be noted that the lines 171, 172 and 173 corresponding in significance to the lower applied frequency M, line 164 in Fig. 22, intersect the horizontal axis of coordinates at points which represent speeds in proximity to the operating speed, while the line 174 would, if extended, intersect the horizontal axis at a point farther removed from the point of operating speed. This diagram, then, shows that the wheel to which it corresponds would develop stationary wave phenomena corresponding to 6, 8, and 10 nodes, at speeds not far below the operating speed, but would not develop wave phenomena corresponding to four nodes except at a speed considerably above the operating speed.

As has already been explained, when these critical speeds, indicated by the points of intersection with the zero frequency line, correspond with the frequency of rotation of the wheel, then any stationary applied force will induce wave phenomena in the wheel. It may be noted in passing that, if in the operation of the wheel itself there be any force periodically acting upon the wheels, such a force, if its period or frequency be of appropriate value may have the same effect as the alternating current magnet 91 had in inducing wave phenomena in the wheel. Thus, for example, if the wheel or its shaft or other rotating parts be unbalanced so as to produce periodic impulses of the same frequency as the speed of rotation of the wheel, then whenever these impulses coincide with the frequencies represented by the lower applied frequency curve M, such as 164 in the diagram 22, or the curves 171 to 174 in Fig. 23, wave phenomena may develop. The line 175 in Fig. 23 is a straight line drawn through ordinates which correspond to frequencies numerically equal to the speeds of rotation. If, therefore, there is a pulsation for each revolution of the wheel, due to unbalancing or the like, then wave phenomena may be expected to develop at the points where this line crosses the lines 171 to 174. It has been found however that such difficulties are of very rare occurrence and of small magnitude and may be neglected. I therefore term the speeds at which these phenomena may occur as minor critical speeds because of their relative unimportance and infrequent occurrence. The ten node critical speed and those of still higher order have been found to be of minor importance. Two node waves cannot remain stationary in space and are also of minor importance.

To insure safe operation of an elastic fluid turbine, it is of course essential that all of the wheels of the turbine rotor, without exception, should be of such construction as to be free from critical speeds within dangerous proximity to the operating speed of the rotor. What this requirement means may, perhaps, be better visualized by plotting in diagrammatic form the critical speeds of the wheels of the rotor. Figs. 24 and 25 show such plots or diagrams in the case of two twenty-two stage steam turbines which do not embody the present invention. In these diagrams the abscissas represent revolutions per minute of the turbine rotor wheel; and the ordinates represent different wheels of the corresponding rotor, according to the number of the stage. Thus, the horizontal line marked 10 represents the 10th stage wheel; the next, though unnumbered, represents the 11th stage wheel; the line numbered 12, the 12th stage wheel, and so on. For each wheel, provided the data has been obtained, there is noted a critical speed corresponding to four nodes, another for six nodes and another for eight nodes. These critical speeds are indicated in the diagram by circles, squares and triangles respectively. For all of the wheels, the critical speed points corresponding to a given number of nodes are tied together by a line, whereby for each number of nodes, the relations of the critical speeds in the different turbine wheels may the better be observed. Thus, in Fig. 24, a dotted line marked "six nodes," passes through all of the six node critical speed points. Similarly, other lines pass through the critical speed points corresponding to four nodes and to eight nodes.

In Fig. 25 the critical speed points corresponding to different nodes are similarly connected together. It will be observed that in this case, as well as in the case of the turbine represented in Fig. 24, there appears to be no definite relation between the critical speeds of successive turbine wheels, other than a general tendency for those wheels corresponding to lower stage numbers, and which are therefore of smaller diameter, to have their critical points at higher speeds of revolution than turbine wheels of higher numbers of stages, and therefore of larger diameter.

It will be observed that in both the turbines, the critical speeds of which are represented in Figs. 24 and 25, critical speeds occur dangerously close to the operating speed for certain wheels in one case but safely removed therefrom in corresponding wheels in the other turbine. Thus, in Fig. 24, the 15th, 16th, and 17th stage wheels all have critical speeds, corresponding both to six and eight nodes, occurring close to the operating speed, whereas for the corresponding wheels in the turbine represented in Fig. 25, these critical speeds though still in the neighborhood of the operating speed, are removed therefrom by at least 10%. However, the four node critical speeds for the 20th, 21st and 22nd stage, in both diagrams, occur in closely corresponding relation in the two cases to the operating speed. These diagrams serve to indicate, not only the danger, but the practical certainty, that somewhere through the succession of wheels on the turbine rotor there will occur one or more critical speeds which are dangerously close to the operating speed, and therefore liable to give rise to accidents sooner or later in the life of the turbine, unless the dangerous wheels are altered or "tuned," as it may be termed.

When the turbine wheels of a steam turbine rotor have been designed and predetermined, in accordance with the principles herein set forth, the diagram of critical speeds for all stage wheels of the rotor will disclose complete absence of critical speeds from the region in immediate proximity to the operating speed. Diagrams such as this are shown in Figs. 26 and 27, and will be largely self-explanatory and represent machines especially designed to assist wave phenomenon. It will be observed that in both cases there are no critical speeds occurring in either case within 15% of the operating speed. It will be noted, however, that in Fig. 26 critical speeds in the 16th and 17th stage wheels, corresponding to six and eight nodes, occur at speeds below the operating speed while in the case of the other turbine, the critical speeds of which are represented in Fig. 27, all of the critical speeds lie above the operating speed. This latter location of critical speeds, above the operating speed, is of course preferable where possible of attainment.

In determining the safe limits which should exist between the normal operating speed of the rotor, and the speeds at which dangerous wave phenomena are developed, a number of considerations are involved. In the first place, a certain broadness of resonance exists, throughout which critical speeds may be developed. That is to say, wave phenomena do not occur with precise mathematical accuracy at one particular speed only, but may occur at speeds slightly above and slightly below a speed taken as corresponding to the condition of maximum resonance. This margin above and below is what is here termed the broadness of resonance. Observations have shown that in the case of steam turbine wheels developing wave phenomena, this broadness of resonance amounts to about 2% above and 2% below the critical speed.

Another factor of which account must be taken in determining the safe limits between the operating speed and the critical speeds, is the determination of the numerical coefficient B. This coefficient B, hereinbefore referred to, serves to determine the magnitude of the nodal running frequency of the turbine wheel when the standing frequency is known. This coefficient varies according to the design and construction of each particular turbine wheel and, as already explained, is determined by actual test of the wheel in the wheel testing machine (Fig. 12). The errors which may occur in applying these coefficients or factors to like wheels, not put through the testing machine, but which have been vibrated to determine their standing frequencies, are estimated as amounting to not more than 5% in the case of six and eight node wave phenomena. In this 5% allowance, slight changes of natural frequency due to changes of temperature are included.

Still another consideration, of which account must be taken, is the fact that a turbo-alternator, when running under practical conditions, may, for the purpose of adjusting the electrical load taken by the machine when operated in conjunction with other machines and possibly for other reasons, be operated, not at exactly its rated speed, but may be raised in speed by as much as 3% or lowered in speed by an equal amount.

Adding together the factors mentioned, viz, the factors 2+5+3 gives the figure 10, which is the smaller limit determined upon and which is especially applicable to six and eight node wave phenomena. In the case of four node wave phenomena, it has been found that greater error is likely to occur in the determination of the critical speed by the use of the factor B, and this error has been determined as amounting to about 5% more than the 5% in the case of six and eight node wave phenomena. Hence, for wave phenomena in four nodes, the safe limit is taken as being 15%.

In the practical carrying out of my invention, every turbine wheel for a given turbine rotor is to be so predetermined or adjusted as to have no critical speed points within the limits of safety as herein set forth. This predetermination or adjustment may be guided by information obtained by rotating the wheel in a wheel testing machine, as herein described, or it may be done upon the basis of calculations depending upon the natural frequency of the wheel when at rest in cases where that wheel is so closely like other wheels that have already been tested in the wheel testing machine, that the constant or coefficient B can be used with a satisfactory degree of accuracy.

In proportioning or in adjusting or "tuning" a wheel to obtain the desired relation between the critical nodal speeds of the wheel and the normal operating speed, the relations between the stiffness of the parts of the wheel and the mass of the parts of the wheel must be made such as to give the desired natural frequencies of vibration in the wheel. In general, it may be stated that in a vibrating system, such as a turbine disk, the frequencies of vibration increase with the stiffness of the wheel and decrease with an increase in magnitude of the mass of the wheel. This may be expressed by the formula $$\text{Frequency} = \frac{1}{2\pi}\sqrt{\frac{F}{M}}$$

where F equals stiffness and M equals mass or weight.

From this formula it is evident that the greater the stiffness of a wheel and the less the mass, the higher the frequencies of vibration of the wheel will be. In designing a wheel in the first instance, or in adjusting or "tuning" a wheel already built, the relation thus expressed between the stiffness and the mass of the wheel must be carefully observed in order to secure the results desired.

Since nodal frequencies of different numbers of nodes correspond to bending actions or flexures extending into the body of the wheel toward the center thereof to greater or less degree, depending on the number of nodes, changes in the relations between stiffness and mass may be expected to affect the different degrees of frequencies corresponding to different numbers of nodes. Thus, as will be seen by reference to Figs. 8 to 11, the higher the number of nodes, the less is the distance inwardly toward the center of the wheel over which disturbances due to nodal flexing of the wheel are exerted. In order therefore for a wheel to be free from dangerous critical nodal speeds, a proper coordination between the stiffness and mass of different portions of the wheel should exist.

Whenever there is reason to suppose that an existing wheel may have a critical nodal speed in the neighborhood of the operating speed, the wheel may first be vibrated when off of the shaft and the nodal critical speeds thereby determined in the manner already set forth. I find it advantageous, for the purpose of noting the nodal areas during vibration of a wheel, to cover the wheel web with a thin body of water. When the wheel is in nodal vibration, the surface of the water exhibits rough or rippled areas conforming to the nodal vibration areas of the wheel. If it then be found that any of the critical speeds lies close to the danger limits for the four, six and eight node wave phenomena, then the wheel may be assembled on the shaft upon which it is to run in the turbine, and again vibrated in order to determine the critical speeds as altered by the fit of the wheel on the shaft. Ordinarily, wheels have slightly higher critical speeds after being shrunk on to the shaft than when tested off of the shaft. This difference may be estimated from previous tests of similar wheels, or it may be determined, as indicated, by actual test of the wheel itself while on the shaft. If the nodal speeds, with the wheel fitted to the shaft, are still within the danger limits, the wheel is then removed from the shaft and tuned by altering its proportions so as to change its vibrating characteristics or frequency.

The tuning or reproportioning of the wheel may be done in a variety of ways.

Thus, metal may be removed from certain locations, depending on the nodal frequency which it is desired to change, or the buckets may be removed and re-machined or replaced by heavier buckets. In order to secure the desired relation between wheel stiffness and wheel mass, it is ordinarily feasible, in the case of a wheel already constructed, to effect the adjustment only by removal of material since for mechanical reasons weight cannot well be added uniformly, except in the case of replacement of buckets by heavier buckets. By way of illustration, we may suppose the case of a 22 stage wheel with buckets 28 inches long and a disk diameter of 7½ feet, which upon being vibrated disclosed, upon calculation as above set forth, the existance of a four node critical speed approximately 8% above the operating speed, and critical speeds corresponding to six and eight nodes outside the lower 10% limit for these critical speeds. In this case then, it is necessary to raise the four node frequency to at least 15% above the operating speed. This result may be effected by properly reducing the weight of the buckets. This may be done by first temporarily attaching known weights to the shroud band of the wheel so as to determine approximately the effect of the addition in weight on the frequencies of the wheel. Thus different numbers of bolts may be clamped across the edge of the wheel to furnish the added weight. The approximate effect of different weights being thus obtained, the buckets are then removed and the known amount of material machined off of the backs of the buckets, thereby making what is known as tapered buckets. If the weight to be removed is very great, too great in fact to be feasible, then it is necessary to use a new and heavier wheel in order to have the four node frequency at least 15% above the operating speed.

Figure 28:
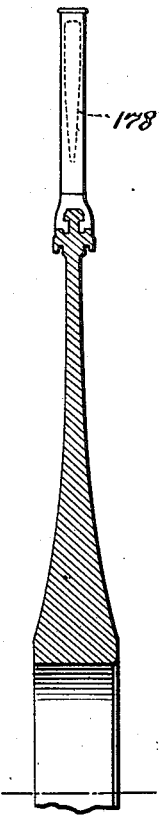
Figure 29:
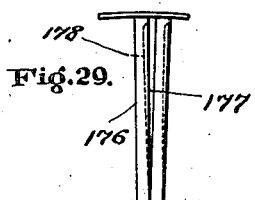
Figure 30:
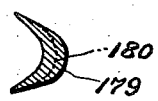

The removal of weights from the outer or convex portions of the buckets, is illustrated, for example, in Figs. 28, 29, and 30. Fig. 28 is a partial sectional view of a wheel with the section taken through the space between two adjacent buckets. The normal outline of a bucket is indicated in full lines in Fig. 29 at 176 and 177, while the region of removal of material is indicated by the space enclosed by the dotted line 178.

Fig. 30 is a section of the bucket and indicates in full lines 179 the original section of the bucket and in dotted lines 180, the limits down to which the material of the bucket has been machined to reduce weight. The removal of weight from the buckets of a wheel, reduces the mass without usually very much reducing the stiffness of the wheel, and results in a rise in the frequency of the 4, 6 and 8 and higher nodal vibrations and consequently the corresponding critical nodal speeds. As already explained, the critical speeds, during these operations, are calculated by using the standing frequency obtained by the vibrating tests and the so-called running coefficient B derived from tests of similar wheels in the wheel testing machine.

As another illustration, consider a wheel with buckets 11½ inches long and with a disk diameter of 6 feet, and let it be supposed that vibrating tests show the existence of a six node critical speed about 3% above the operating speed, and an eight node critical speed about 4% below the operating speed, and a four node critical speed about 25% above the operating speed.

In this case, the six node and the eight node critical speeds may be lowered by removal of material from the wheel at suitable points, but this must be done in such a way that the four node critical speed is not at the same time correspondingly lowered so far as to come within the danger limit of 15%. This means that the six node critical speed must be brought to a point at least 10% below the operating speed, the eight node critical speed lowered from 4% below to 10% below the running speed, and all of this without lowering the four node critical speed by more than 10%. In cases like this, great care must be taken to cut the wheel in the locations which will most affect the nodal critical speed which it is desired to move. Thus, on a wheel like the one under consideration, that is, a wheel with 11½ inch buckets, alterations in the web of the wheel next to the rim or circumference have the greatest effect on the eight node frequency, while alterations in the zone of the wheel from six to eight inches nearer the center have the greatest effect on the six node frequency. In a zone still nearer the center of the wheel and distant from the center ¼ to ⅓ of the radius, alterations by removal of material from the web have most effect on the four node frequency.

For adjusting the six node frequency the wheel is then placed on the boring mill and slightly machined in a zone extending from six to eight inches inwardly in the web from the rim. The wheel is then removed from the boring mill, and again submitted to vibrational test, and the new frequency determined in the same manner as before. These operations should be repeated until the desired frequency is obtained. Thereupon, the wheel is placed on its own shaft and again vibrated in order to confirm the results obtained.

In the case of an eight node critical speed, the operation is similar except that the location of the cut to be made in the boring mill is to be confined closer to the wheel rim and may even involve the rim itself. By rim of the wheel I here refer to the outer portion of the solid web of the wheel to which the buckets are attached.

In some cases, where the trimming off or removal of material from the rim of the wheel fails to produce a sufficient lowering of the natural frequency of the wheel, then a replacement of the buckets of the wheel by others of heavier construction may be necessary.

Every change made in a wheel should of course be followed by careful retesting according to the methods herein set forth, to establish and confirm the results obtained by such changes.

Figure 31:
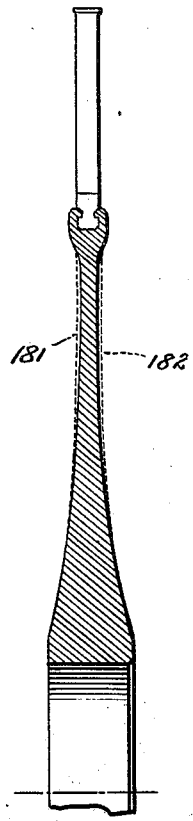

In Fig. 31, which is a partial sectional view of a turbine wheel, the dotted lines 181 and 182 indicate where metal has been removed from the outer portion of the web of the wheel. The removal of metal from this region affects mostly the frequencies corresponding to 6 and 8 nodes, but is without much effect upon the frequency corresponding to 4 nodes.

Figure 32:
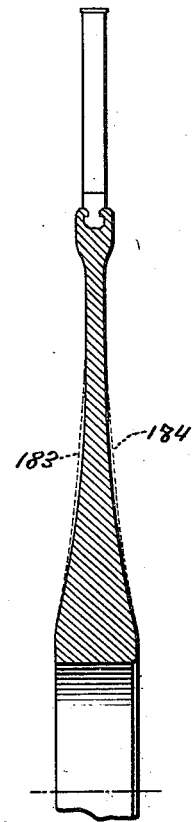

In order to be sure that a 4 node frequency is sufficiently high in the case of designing new wheels, advantage is thus taken of the fact that the 4 node frequency is effected mostly by change of stiffness of the large part of the web of the wheel shown in Fig. 32, parts 183 and 184, the change of stiffness at this location having more effect on the 4 node frequency than that of the change of mass.

The accompanying table will serve to show how the step by step removal of metal from a particular wheel in different regions, affects the nodal frequencies.

| Dimensions. | | | | Nodal frequencies. | | | | |
|---|---|---|---|---|---|---|---|---|
| A | B | C | D | 2 | 4 | 6 | 8 | 10 |
| 1¼″ | 1 11/16″ | 2.000″ | 2⅝″ | 33.5 | 45.3 | 63.2 | 81.7 | 99.3 |
| 1¼″ | 1 11/16″ | 2.000″ | 2⅜″ | 37.7 | 47.3 | 62.7 | 80.3 | 97.8 |
| 1⅛″ | 1 5/8″ | 2.000″ | 2⅜″ | 36 | 45.7 | 60.3 | 78 | 95.2 |
| 1″ | 1⅝″ | 2.000″ | 2⅜″ | 33.3 | 42.3 | 58 | 75.3 | 92.3 |

Figure 33:
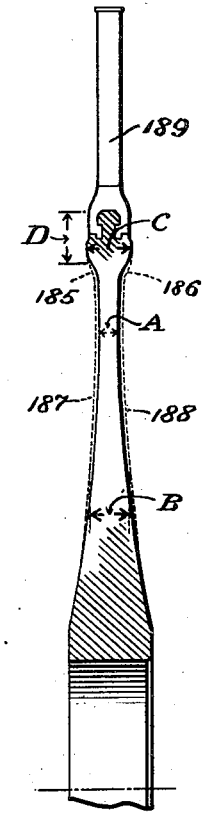

In this table the columns headed A, B, C and D give the dimensions of the wheel in the corresponding regions marked A, B, C, and D in Fig. 33, while at the right of the tabulation the frequencies, in vibrations per second, corresponding to 2, 4, 6, 8 and 10 nodes are given. In each horizontal line the frequencies given correspond to the wheel having the dimensions indicated in that line under the headings A. B, C and D. Thus, it will be noted that the wheel, when first received for tuning, had a thickness at the point A of 1¼ inches, at the point B 1 11/16 inches, at the point C 2 inches, while the distance D was 2⅝ inches. By reference to the second line of figures in the tabulation it will be noticed that the only dimensional change is the dimension corresponding to D, which has been reduced from 2⅝ inches to 2⅜ inches. This means that a section has been chamfered out of the rim of the wheel, as indicated by the dotted lines 185 and 186. By reference to the table of nodal frequencies, it will be observed that this change in the rim of the wheel has changed the 4 node frequency from 45.3 to 47.3, the 6 node frequency from 63.2 to 62.7, and the 8 node frequency from 81.7 to 80.3.

The third horizontal line of figures in the above tabulation shows the results from the removal of material from the web of the wheel. By this machining of the web, the dimension A, near the rim of the wheel, has been reduced ⅛ of an inch, while the dimension B, near the hub of the wheel, has been reduced 1/16 of an inch, all other dimensions remaining the same. The outline of the material thus removed is indicated by dotted lines 187 and 188 in Fig. 33. The effect of this removal of material is, as will be seen from the tabulation, to reduce the 4 node frequency from 47.3 to 45.7, the 6 node frequency from 62.7 to 60.3, and the 8 node frequency from 80.3 to 78.

A further removal of material from the web of the wheel, as shown in the fourth line of the tabulation, consists in this case of a reduction in thickness of the web at the point A from 1⅛ inches to 1 inch, and tapering thence gradually toward the dimension B, which remains unchanged. The 4 node frequency, as will be seen, was reduced from 45.7 to 42.3, the 6 node frequency from 60.3 to 58, and the 8 node frequency from 78 to 75.3. In the wheel thus illustrated in Fig. 33, the over-all dimension of the wheel was between 9 and 10 feet in diameter, and the length of the buckets at 189 about 15 inches, and thickness of the hub, parallel to the axis of the wheel, 5½ inches. The wheel was one designed for the 18th stage of a 35,000 kilowatt turbine operating at 1500 revolutions per minute. The nodal frequencies, obtained by vibrating the wheel at rest, correspond, as has already been explained, to certain critical speeds when the wheel is rotated. The frequencies being known, these critical speeds may be determined very accurately by calculation as herein set forth. In the case of the wheel shown in Fig. 33, the reduction of the frequency for 6 nodes from 63.2 to 58 corresponded to a reduction in the 6 node critical speed from 1446 revolutions to 1320 revolutions per minute of the wheel, thereby removing this critical speed from dangerous proximity to the operating speed.

Since the chemical composition of the metal of a wheel, its homogeneity and other variable factors cannot be absolutely controlled, it will be evident that wheels made as closely as possible to the same dimension nevertheless will differ more or less in their vibrational characteristics. Each wheel therefore requires to be carefully tested and, where necessary, to be tuned in accordance with the principles indicated.

Figure 34:
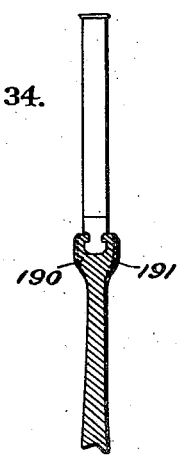

It happens in some cases that small amounts of metal may be removed from certain parts of wheels of certain shapes without materially affecting the natural frequencies of vibration of the wheel. Thus, as shown in Fig. 34 which shows a partial sectional view of a wheel, metal may be removed in small amounts from the side of the wheel rim to which the buckets are attached, in the areas indicated by dotted lines 190 and 191.

In cases of this kind both the stiffness and the mass are reduced in approximately the same degree. The relation between frequency and mass remaining substantially unchanged, no change in the frequency of vibration of the wheel results.

If larger amounts of metal are removed the relation between stiffness and mass may be so altered as to lower the frequency of the 10 node and higher nodal vibrations, with possibly some effect on the vibrational frequencies corresponding to 4, 6 and 8 nodes.

In the building of new wheels it is evident that the data obtained in the previous building of wheels may be utilized in the design of the wheels of similar dimensions and forms. In such cases the coefficient B may be used with a considerable degree of accuracy in calculating the critical speeds where the frequency of vibration of the wheel at rest is known. Even in such cases, however, it is advisable to check the results by rotating the wheel in the wheel testing machine, as herein described.

For convenience in vibrating a wheel or wheels, especially in the case of turbines already installed, a portable vibrating machine, operated by compressed air or other means, may be used.

In Figs. 35 to 40 is shown a mechanical device for vibrating a turbine wheel when standing still in order to determine its natural tendency to vibrate when subjected to applied forces of different frequencies. The device shown is one well adapted for use in the course of manufacture of turbine wheels and also for use to obtain data from turbines installed previous to the adoption of the methods herein set forth. Referring now particularly to Fig. 40, 192 represents a portion of the cover or shroud of a turbine wheel and also some of the buckets to which is it attached. 193 indicates a connecting rod by means of which a rapidly reciprocating force is applied to the wheel to vibrate it. The outer end of the rod is screw-threaded to receive the adjustable parts of a clamp which clamp, in this case, comprises a pair of blocks located on opposite sides of the wheel cover and also a pair of nuts, of which the outer one 194 is provided with a cross-bar so that it may be tightened and loosened by hand. The inner end of the rod is provided with a clevis 195, the legs of which straddle a vibrator, in this case a vertical lever 196, Fig. 35. The lower end of the lever extends into a small block 197 (Fig. 36) which is slotted on its upper side to receive it. Under some conditions the block is vibrated by the lever and at other times it is held stationary or practically so and forms a pivotal support for the lever as will be seen later. The lever and block are loosely connected by a pin-and-slot connection 198 and the block in turn is yieldingly supported between two leaf springs 199 for a purpose to be described later.

The upper end of the lever is attached to a connecting rod 200 which is vibrated by a crank pin 201 on one end of the motor shaft, there being a ball bearing to reduce the friction. The motor, in this case an air turbine, comprises a simple wheel 202 having peripheral buckets which resemble saw teeth and against which compressed air is directed by the nozzle 203 to rotate it. The motor shaft 204 is carried by ball bearings which in turn are supported by bearing brackets 205 on the base of the device. On one end of the motor shaft is a worm 206, Fig. 40, which meshes with a worm wheel to drive an electric generator 207 of any suitable design and forming a part of a tachometer. The bearings for the worm wheel shaft are supported by one of the motor bearing brackets. To prevent vibrations from being transmitted from the driving means to the generator through its shaft, which would be objectionable, and also to compensate for any lack of alignment, a flexible coupling 208 is provided, in this case a rubber tube, which connects the adjacent ends of the shafts. The generator is held between the base and a removable clamp 209, there being interposed bodies of felt 210 to absorb vibration. Current from the generator is supplied to a volt-meter 211 which is calibrated in terms of speed and by means of which the speed of the driving motor can be ascertained and hence the rate of vibrations per unit of time imparted to the turbine wheel.

As previously stated the lower end of the vibrating lever 196 is loosely attached to the block 197 which is confined in the direction of its movements between two leaf springs. These springs are secured at one end to a sliding member 212, Fig. 37, by means of a U-shaped clamp and screws. The member is held between guides 213 and 214 which are secured to the base and is moved to and fro by the adjusting screw 215, the inner end of the screw being free to turn in the member due to the groove-and-pin connection 216 as shown in Fig. 38. The member is held in sliding engagement with the base by a flat and relatively stiff spring 217. As the leaf springs are moved to the right in Figs. 36 and 39, their tension or effective action on the block 197 is increased because said springs are stiffer at their base than at their outer ends. Compressed air at suitable pressure is supplied to the motor through its nozzle 203 and supply pipe 218, subject to the control of the hand throttle valve 219.

The action of the vibrator is as follows:— The base of the device is rigidly clamped to a support adjacent the turbine wheel which is to be vibrated, after which the outer end of the connecting rod 193 is securely clamped to the bucket cover or shroud of the turbine wheel. Compressed air is then admitted to the motor which causes its wheel to rotate and in so doing to actuate the vibrator or lever 196. At the start the tension on the leaf springs is purposely made comparatively light and the lever vibrates about its pivotal connection to the connecting rod 195 as an axis. The tension of the springs is then gradually increased by the adjusting screw 215 with the result that the movements of the lower end of the vibrator and block 197 gradually decrease in amplitude to zero or practically so, and virtually the whole force exerted by the motor is transmitted through its crank-pin 201, connecting rod 200, lever 196, and rod 193 to the bucket wheel. This rapidly applied force first in one direction and then in the other causes the bucket wheel to vibrate with a rapidity depending upon the motor speed. The operator, either by the sense of touch or by pools of water or granulated coal or coarse sand on the wheel, if it be in a horizontal position, determines the number of nodes or periods of vibration of the wheel under these conditions and makes a note of the motor speed which causes them.

As the mass of the turbine wheel to be vibrated is great as compared with that of the vibrator itself, it is difficult to change from one nodal frequency of the wheel to another by merely changing the speed of the motor and therefore the method commonly employed is to release the spring tension on the block 197 until such time as the turbine wheel comes to rest or practically so. The motor is then operated at a substantially higher speed which experience shows will give a higher nodal frequency to the turbine wheel, the spring tension on the block 197 is readjusted as before until the wheel is again set into vibration and at higher rate. This method of operation and observation is repeated until all of the nodal frequencies of the wheel for its designed operating conditions have been determined.

What I claim as new and desire to secure by Letters Patent of the United States, is:

1. A turbine rotor comprising a shaft and a plurality of turbine wheels mounted thereon, at least one of said wheels possessing such stiffness and mass that it has a critical speed in the neighborhood of the normal operating speed of the rotor, the rotor being further characterized by the fact that all of the wheels on said rotor are so proportioned that no standing waves of appreciable magnitude are produced in any of said wheels at speeds closer to the normal operating speed than approximately 10% of said operating speed.

2. A turbine rotor having a shaft and a plurality of turbine wheels mounted thereon, at least one of said wheels possessing such stiffness and mass that it has a critical speed in the neighborhood of the normal operating speed of the rotor, the rotor being further characterized by the fact that all of the wheels on said rotor are so predetermined or adjusted as to their natural periods of vibration, as affected by the action of centrifugal force at the normal operating speed of the rotor, that no resonance conditions corresponding to four nodes occur at any speed closer to the normal operating speed than 15% of said operating speed, and that no resonance conditions corresponding to six nodes or eight nodes occur at any speed closer to the normal operating speed than 10% of said operating speed.

3. A multistage turbine rotor having at least one wheel which has a critical speed in the neighborhood of the normal operating speed of the rotor, and wherein all of the wheels on said rotor are so predetermined or adjusted that no one of them has a natural period of vibration which tends to produce a critical speed corresponding to four nodes at any speed substantially closer to the normal operating speed than 15% of said operating speed, nor any critical speed corresponding to six or eight nodes at any speed substantially closer than 10% to the normal operating speed.

4. A rotor for a turbine comprising a shaft and a plurality of turbine wheels thereon, said rotor being of that type characterized by one or more nodal critical speeds in one or more of the turbine wheels in the neighborhood of the normal operating speed of the rotor, the rotor being further characterized by the fact that all of the wheels on said rotor are so predetermined or adjusted as to their natural periods of vibration that no one of them tends to develop nodal wave phenomena corresponding to four nodes at any speed substantially closer to the normal operating speed of the rotor than 15% of said operating speed, and so that no one of the wheels on the rotor tends to develop nodal wave phenomena corresponding to six nodes or eight nodes at any speed substantially closer to the normal operating speed of the rotor than 10% of said operating speed.

5. A multistage turbine rotor in which one or more of the turbine wheels have a critical speed in the neighborhood of the normal operating speed of the rotor, and further characterized by the fact that all of the wheels on said rotor are so predetermined or adjusted with respect to the relations between stiffness and mass for each individual wheel that no one of the wheels has a dangerous critical speed closer to the normal operating speed than 10% of said operating speed.

6. The method of predetermining the natural period of vibration of a turbine wheel to secure freedom from dangerous critical speeds, which consists in determining that rotational speed of the wheel at which wave phenomena corresponding to four nodes markedly occur, and determining also those rotational speeds at which wave phenomena corresponding respectively to six and eight nodes markedly occur, and thereupon tuning or reproportioning the wheel in case a critical speed corresponding to four nodes occurs closer to the normal operating speed than 15% of said operating speed, and likewise tuning or reproportioning the wheel in case a speed corresponding to wave phenomena of six or eight nodes occurs closer to the normal operating speed than 10% of said operating speed.

7. The method of avoiding dangerous wave phenomena in all of the turbine wheels of a turbine rotor, which consists in determining the frequency of each wheel when at rest, determining therefrom the speed or speeds nearest to the normal operating speed of the rotor at which a dangerous critical speed or speeds is likely to occur, and tuning or otherwise altering the wheel, if necessary, to cause a critical speed due to a natural tendency of the wheel to produce wave phenomena corresponding to four nodes to be removed from the normal operating speed by at least 15% of said operating speed, and critical speeds corresponding to wave phenomena of six and eight nodes to be removed from the operating speed by substantially 10% or more of said operating speed.

In witness whereof, I have hereunto set my hand this 26th day of February, 1923.

WILFRED CAMPBELL.